US009432573B2

(12) United States Patent
Arakawa

(10) Patent No.: US 9,432,573 B2
(45) Date of Patent: *Aug. 30, 2016

(54) APPARATUS FOR DETECTING INFORMATION OVERLAID ON LIGHT AND SYSTEM INCLUDING THE APPARATUS

(71) Applicant: Panasonic Intellectual Property Management Co., Ltd., Osaka (JP)

(72) Inventor: Kenji Arakawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,029

(22) Filed: Feb. 9, 2015

(65) Prior Publication Data

US 2015/0156411 A1    Jun. 4, 2015

Related U.S. Application Data

(63) Continuation of application No. 13/600,510, filed on Aug. 31, 2012, now Pat. No. 8,982,233, which is a continuation of application No. PCT/JP2011/000655, filed on Feb. 7, 2011.

(30) Foreign Application Priority Data

Mar. 9, 2010  (JP) ................................. 2010-052198

(51) Int. Cl.
*H04N 5/232* (2006.01)
*H04N 5/235* (2006.01)

(52) U.S. Cl.
CPC .......... *H04N 5/23222* (2013.01); *H04N 5/232* (2013.01); *H04N 5/2354* (2013.01); *H04N 5/23293* (2013.01)

(58) Field of Classification Search
CPC ............. H04N 5/2354; H04N 1/6086; H04N 5/23222; H04N 5/23293; H04N 5/232
See application file for complete search history.

(56) References Cited

U.S. PATENT DOCUMENTS 7,898,570 B2    3/2011  Yokota et al.
8,294,779 B2    10/2012 Miyata
(Continued)

FOREIGN PATENT DOCUMENTS

CN    1906922 A    1/2007
CN    101621617 A   1/2010
(Continued)

OTHER PUBLICATIONS

International Search Report (in English language) issued in International (PCT) Application No. PCT/2011/000655 on Apr. 5, 2011.
Office Action issued Sep. 1, 2014 in corresponding Chinese Application No. 201180011633.7 (with partial English translation).

*Primary Examiner* — Mekonnen Dagnew
(74) *Attorney, Agent, or Firm* — Wenderoth, Lind & Ponack, L.L.P.

(57) ABSTRACT

An imaging apparatus according to an implementation of the present invention includes: an imaging device unit which converts light coming from an object into an image signal, the light being illuminating light reflected off an object; a light pattern detecting unit which detects a light-dark pattern from the image signal so as to detect information overlaid on the illuminating light, the image signal being converted from the light by the imaging device unit; a comparing unit which compares detection information with predetermined determination information, the detection information being the information detected by the light pattern detecting unit; and a display unit which displays a specific image, depending on a result of the comparison by the comparing unit.

20 Claims, 21 Drawing Sheets

(56) References Cited

U.S. PATENT DOCUMENTS

| | | |
|---|---|---|
| 8,411,158 B2 | 4/2013 | Miyata |
| 2007/0216775 A1 | 9/2007 | Yokota et al. |
| 2008/0303909 A1 | 12/2008 | Watanabe et al. |
| 2009/0268023 A1* | 10/2009 | Hsieh .......................... 348/143 |
| 2009/0322895 A1 | 12/2009 | Miyata |
| 2010/0277618 A1* | 11/2010 | Hiratsuka .......... H04N 1/32112 348/239 |
| 2012/0170939 A1* | 7/2012 | Schenk ............. H05B 37/0272 398/106 |
| 2013/0010171 A1 | 1/2013 | Miyata |
| 2013/0121567 A1* | 5/2013 | Hadap ................... G06T 15/50 382/162 |

FOREIGN PATENT DOCUMENTS

| | | |
|---|---|---|
| JP | 2000-152217 | 5/2000 |
| JP | 2005-174877 | 6/2005 |
| JP | 2006-301417 | 11/2006 |
| JP | 2007-43579 | 2/2007 |
| JP | 2007-96556 | 4/2007 |
| JP | 2008-5438 | 1/2008 |
| JP | 2008-78845 | 4/2008 |
| JP | 2009-177254 | 8/2009 |
| JP | 2009-188504 | 8/2009 |
| JP | 2009-188865 | 8/2009 |

* cited by examiner

| Number | Determination Code | Direction |
|---|---|---|
| 1 | 10001 | No imaging |
| 2 | 10010 | No flash lighting |
| 3 | ... | Assist light off |
| 4 | ... | Increase ISO speed |
| 5 | ... | No still image |
| 6 | ... | No moving image |
| 7 | ... | No shutter sound |
| 8 | ... | Open mechanical shutter |
| 9 | ... | Image undisplayed |
| 10 | ... | Switching to EVF |
| 11 | ... | Reduce brightness |
| ⋮ | ⋮ | ⋮ |

| Number | Direction Code | Direction |
|---|---|---|
| 1 | 10010 | No flash lighting |
| 2 | ... | No still image |
| ⋮ | ⋮ | ⋮ |

APPARATUS FOR DETECTING INFORMATION OVERLAID ON LIGHT AND SYSTEM INCLUDING THE APPARATUS

CROSS REFERENCE TO RELATED APPLICATIONS

This is a continuation of application Ser. No. 13/600,510, filed Aug. 31, 2012, which is a continuation application of PCT Patent Application No. PCT/JP2011/000655 filed on Feb. 7, 2011, designating the United States of America, which is based on and claims priority of Japanese Patent Application No. 2010-052198 filed on Mar. 9, 2010. The entire disclosures of the above-identified applications, including the specifications, drawings and claims are incorporated herein by reference in their entirety.

TECHNICAL FIELD

The present invention relates to an imaging apparatus for imaging an object under illuminating light.

BACKGROUND ART

Recent digital cameras, such as digital still cameras and digital camcorders, are capable of obtaining images having higher quality. Such digital cameras are also becoming smaller in size. Thus, the digital cameras allow users to easily obtain high quality images at various scenes.

Meanwhile, there is a problem that, without prior consent, some users would operate a digital camera, and obtain prohibited images and pictures at a place where obtaining images is prohibited, such as a museum and a lecture hall. Moreover, not knowing photographing is prohibited, some users would inadvertently obtain images by a digital camera. Furthermore, in using a digital camera, other users would unintentionally use a flash unit at a place where no flash photography is allowed.

In order to solve the problems, Patent Literature 1 discloses an imaging apparatus (hereinafter referred to as a conventional imaging apparatus) which limits its availability by selectively performing its imaging functions in capturing an object which produces a temporally-varying light pattern. The conventional imaging apparatus controls itself by detecting a control ID overlaid on the light as information.

CITATION LIST

Patent Literature

[PTL 1] Japanese Unexamined Patent Application Publication No. 2009-177254 (Page 8, FIG. 3, and the like)

SUMMARY OF INVENTION

Technical Problem

The conventional imaging apparatus inevitably requires an extra light-receiving device dedicated for detecting information overlaid on light, in addition to a Charge Coupled Device (CCD) as an imaging device. This causes a problem of a cost increase of the imaging apparatus.

The present invention is conceived in view of the above problems and has an object to provide an imaging apparatus and the like which detects information overlaid on light at a low cost.

Solution to Problem

In order to solve the above problems, an imaging apparatus according to an aspect of the present invention images an object subject to illuminating light on which information is overlaid. The imaging apparatus includes: an imaging device unit which converts light which comes from the object, into an image signal, the light including the illuminating light reflected on the object; a light pattern detecting unit which detects a contrast pattern from the image signal so as to detect the information overlaid on the illuminating light, the image signal being converted from the light by the imaging device unit; a comparing unit which compares detection information with predetermined determination information, the detection information being the information detected by the light pattern detecting unit; and a display unit which displays a specific image, depending on a result of the comparison by the comparing unit.

In other words, the imaging device unit converts the light, which comes from the object into, an image signal. The light pattern detecting unit detects a light-dark pattern from the image signal so as to detect the information overlaid on the illuminating light. In other words the above feature eliminates the need for a dedicated light receiving element to be used for detecting information overlaid on the light other than the imaging device unit converting light into the image signal. Hence, the feature successfully achieves detection of information overlaid on light at a low cost.

Preferably, the imaging device unit converts the light which comes from the object into the image signal, using a complementary metal oxide semiconductor (CMOS) image sensor, the image signal indicates a raw data item corresponding to a picture, the light pattern detecting unit calculates, based on the raw data item, luminance values for pixels which constitute the picture corresponding to the raw data item, and the light pattern detecting unit detects, as the contrast pattern, states of the luminance values corresponding to the picture.

Preferably, the imaging device unit converts the light which comes from the object into the image signal, using a charge coupled device (CCD) image sensor, the image signal indicates raw data items each corresponding to one of pictures, the light pattern detecting unit calculates, based on each of the raw data items, luminance values for pixels which constitute the one picture corresponding to the raw data item, and the light pattern detecting unit detects, as the contrast pattern, a state of each of the luminance values corresponding to one of the pictures.

Preferably, the image signal indicates a raw data item corresponding to a picture, the imaging apparatus further includes an image processing unit which calculates, based on the raw data item, luminance values for pixels which constitute a picture corresponding to the raw data item, and the light pattern detecting unit is configured to detect, as the contrast pattern, states of the luminance values corresponding to the picture.

Preferably, the comparing unit compares the detection information with the determination information to determine whether or not the detection information matches with the determination information, and the display unit (i) displays the specific image in the case where the detection information matches with the determination information, and (ii) avoids displaying the specific image in the case where the detection information does not match with the determination information.

Preferably, the imaging apparatus includes a storage unit stores the determination information.

Preferably, the determination information indicates a direction to prohibit imaging, the imaging apparatus further includes a mode setting unit which sets a no-imaging mode, which does not allow imaging, as an operation mode for the imaging apparatus in the case where the detection information matches with the determination information, and the specific image shows that imaging is prohibited.

Preferably, the imaging apparatus further includes a flash lighting unit configured to produce a flash of light, the determination information indicates a direction to prohibit producing the flash of light in imaging, the imaging apparatus further includes a flash lighting control unit which causes the flash lighting unit to turn off the flash of light in imaging, in the case where the detection information matches with the determination information, and the specific image shows that producing the flash of light is prohibited.

Preferably, the determination information indicates a direction to increase an international organization standard (ISO) speed in imaging, and the imaging apparatus further includes an ISO speed changing unit which performs control to increase an ISO speed in imaging, in the case where the detection information matches with the determination information.

This feature makes it possible to increase the ISO speed in imaging so as to compensate for an insufficient light amount and obtain a good image.

Preferably, the imaging apparatus further includes an assist light unit which emits assist light for assisting auto focusing, the determination information indicates a direction to turn off the assist light in imaging, and the imaging apparatus further includes an assist light control unit which causes the assist light unit to turn off the assist light in imaging, in the case where the detection information matches with the determination information.

Preferably, the determination information indicates a direction to prohibit obtaining a still image, and the imaging apparatus further includes a mode setting unit which sets a no-still-image mode which does not allow the obtainment of a still image as an operation mode for the imaging apparatus, in the case where the detection information matches with the determination information.

Preferably, the determination information indicates a direction to prohibit obtaining a moving image, and the imaging apparatus further includes a mode setting unit which sets a no-moving-image mode which does not allow the obtainment of a moving image as an operation mode for the imaging apparatus, in the case where the detection information matches with the determination information.

Preferably, the determination information indicates a direction to prohibit outputting shutter sound, and the imaging apparatus further includes: a speaker which outputs audio; and a shutter sound control unit configured to cause the speaker to mute audio recognized as the shutter sound, in the case where the detection information matches with the determination information.

Preferably, the imaging apparatus further includes a mechanical shutter unit configured to open and close a mechanical shutter to change an exposure time, wherein the determination information indicates a direction to open the mechanical shutter, and the imaging apparatus further includes a mechanical shutter control unit which causes the mechanical shutter unit to open the mechanical shutter, in the case where the detection information matches with the determination information.

Preferably, the determination information indicates a direction to reduce brightness of an image, and the imaging apparatus further includes a display control unit which causes the display unit to reduce brightness of an image being displayed on the display unit, in the case where the detection information matches with the determination information.

Preferably, the determination information indicates a direction to reduce brightness of an image, and the imaging apparatus further includes: an electronic view finder (EVF) to display an image; and a display control unit configured to cause at least one of the display unit and the EVF to reduce brightness of an image being displayed on the display unit and the EVF, in the case where the detection information matches with the determination information.

Preferably, the imaging apparatus further includes: an operating unit configured to receive an operation from outside; a status indicating unit configured to emit status light to indicate an operating status of the imaging apparatus; and a status indication control unit configured to cause, when the operating unit receives an operation to indicate an operating status of the imaging apparatus, the status indicating unit to blink the status light at a predetermined period corresponding the operating status of the imaging apparatus.

This feature makes it possible for the status indicating unit to blink the status light at a predetermined period, and successfully lets the user know an operating status of the imaging apparatus.

Preferably, the determination information indicates a direction to prohibit obtaining a still image, and the display unit displays the specific image to ask a user whether or not to set a moving image mode for obtaining a moving image as an operation mode for the imaging apparatus, in the case where the detection information matches with the determination information.

Preferably, the determination information indicates a direction to prohibit obtaining a moving image, and the display unit displays the specific image to ask a user whether or not to set a still image mode for obtaining a still image as an operation mode for the imaging apparatus, in the case where the detection information matches with the determination information.

An information detection method according to another aspect of the present invention is carried out by an imaging apparatus that images an object subject to illuminating light on which information is overlaid. The imaging apparatus includes: an imaging device unit which converts light which comes from the object, into an image signal, the light including the illuminating light reflected on the object; and a display unit which displays an image. The information detection method includes: detecting a contrast pattern from the image signal so as to detect the information overlaid on the illuminating light, the image signal being converted from the light by the imaging device unit; comparing detection information with predetermined determination information, the detection information being the information detected in the detecting; and displaying on the display unit a specific image, depending on a result of the comparison in the comparing.

It is noted that, in the present invention, part or all of the constituent elements in the imaging apparatus may be configured in a form of a System-Large-Scale-Integration (LSI).

Furthermore, the present invention may be implemented as an information detecting method achieving operations of characteristic units in the imaging apparatus as steps. In addition the present invention may be implemented as a program which causes a computer to execute each of the steps included in the information detecting method. The present invention may also be implemented as a computer-readable recording medium which stores such a program. The program may be distributed through a transmission medium such as the Internet.

Advantageous Effects of Invention

The present invention successfully achieves detection of information overlaid on light at a low cost.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 exemplifies a determination information table.

FIG. 6 exemplifies a direction information table.

DESCRIPTION OF EMBODIMENT

Described hereinafter is an embodiment of the present invention, with reference to the drawings. It is noted that constitutional features sharing the same numerical reference in the embodiment carry out a similar operation. Thus, repetition of the details of such features may be omitted.

Embodiment

Figure 1:
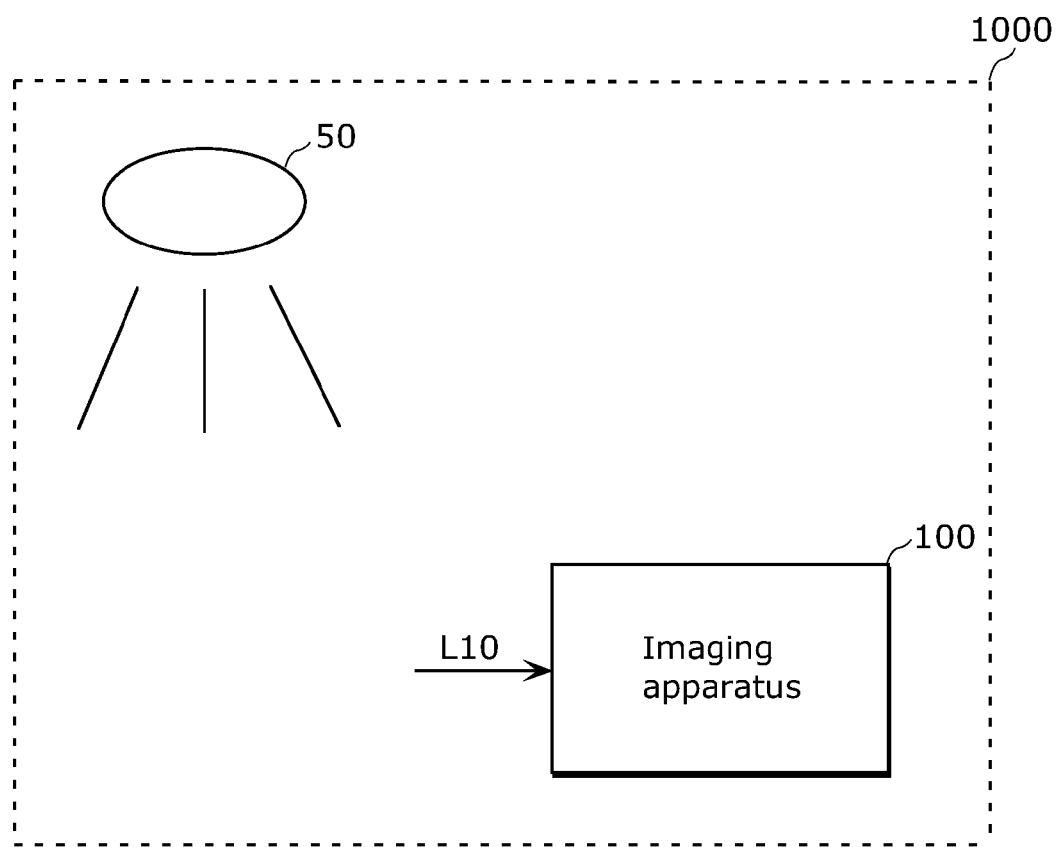
FIG. 1 depicts a block diagram showing a structure of an imaging system according to an embodiment.

FIG. 1 depicts a block diagram showing a structure of an imaging system 1000 according to an embodiment.

As shown in FIG. 1, the imaging system 1000 includes an illuminating apparatus 50 and an imaging apparatus 100.

The imaging apparatus 100 is a digital camera, such as a digital still camera and a digital camcorder.

The illuminating apparatus 50 emits light having information overlaid. The details of the light 50 shall be described later. Hereinafter, the light emitted from the illuminating apparatus 50 is referred to as illuminating light. The illuminating apparatus 50 is a liner fluorescent lamp which glows with alternating-current (AC) voltage. The illuminating light is emitted on an object (a person, for example) near the illuminating apparatus 50. The imaging apparatus 100 receives light L10 which comes from the object subject to the illuminating light.

It is noted that the illuminating apparatus 50 shall not be limited to the liner fluorescent lamp; instead, the illuminating apparatus 50 may be a Light Emitting Diode (LED) light, a fluorescent lamp inverter, and the like. The illuminating apparatus 50 emits the illuminating light, using an AC voltage provided from a not-shown commercial power supply.

Figure 2:
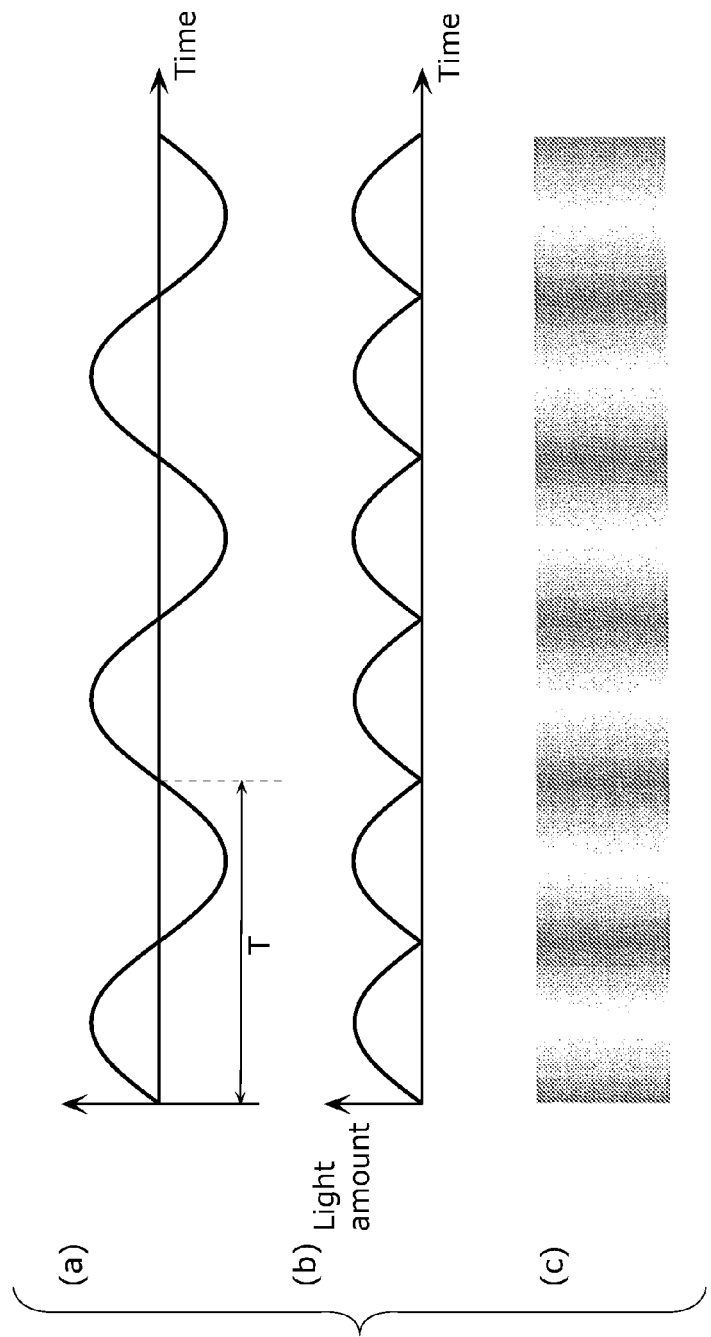
FIG. 2 shows light emitted by a liner fluorescent lamp.

FIG. 2 shows light emitted by a liner fluorescent lamp.

The illustration (a) in FIG. 2 shows a waveform of an AC voltage. The frequency of the AC voltage is, for example, 60 Hz, which is the frequency of the AC power supply provided mainly in western Japan. It is noted the frequency of the AC voltage may be 24 Hz, 50 Hz, 59.94 Hz, and 120 Hz.

The illustration (b) in FIG. 2 shows a change in the amount of the illuminating light emitted by the liner fluorescent lamp operating on the AC voltage. Hereinafter, a change period of the amount of the illuminating light emitted by the liner fluorescent lamp is referred to as a low frequency illuminating period. The low frequency illuminating period corresponds to a power source frequency (60 Hz, for example) of a location where the object is captured (western Japan, for example).

As shown in (b) in FIG. 2, the low frequency illuminating period is T/2 seconds where one period of the AC voltage in (a) in FIG. 2 is T seconds. On the ordinate showing a light amount, the light amount at the point that intersects with the abscissa does not indicate 0 but indicates a little amount of light. The same applies to a light amount shown in a drawing described later.

The illustration (c) in FIG. 2 visualizes how the light amount in (b) in FIG. 2 changes. In (c) in FIG. 2, a lighter part of the illustration shows that the light emitted from the liner fluorescent lamp is brighter. The dark part shows that the light emitted from the liner fluorescent lamp is dim. A darker part of the illustration shows that the light emitted from the liner fluorescent lamp is dimmer.

The illuminating apparatus 50 includes a power supply control circuit (not shown). Described hereinafter is how to overlay information on the illuminating light when the illuminating apparatus 50 is a liner fluorescent lamp. Here, the power supply control circuit in the illuminating apparatus 50 changes the waveform of the AC voltage to be used for emitting light to overlay the information on the illuminating light.

Figure 3:
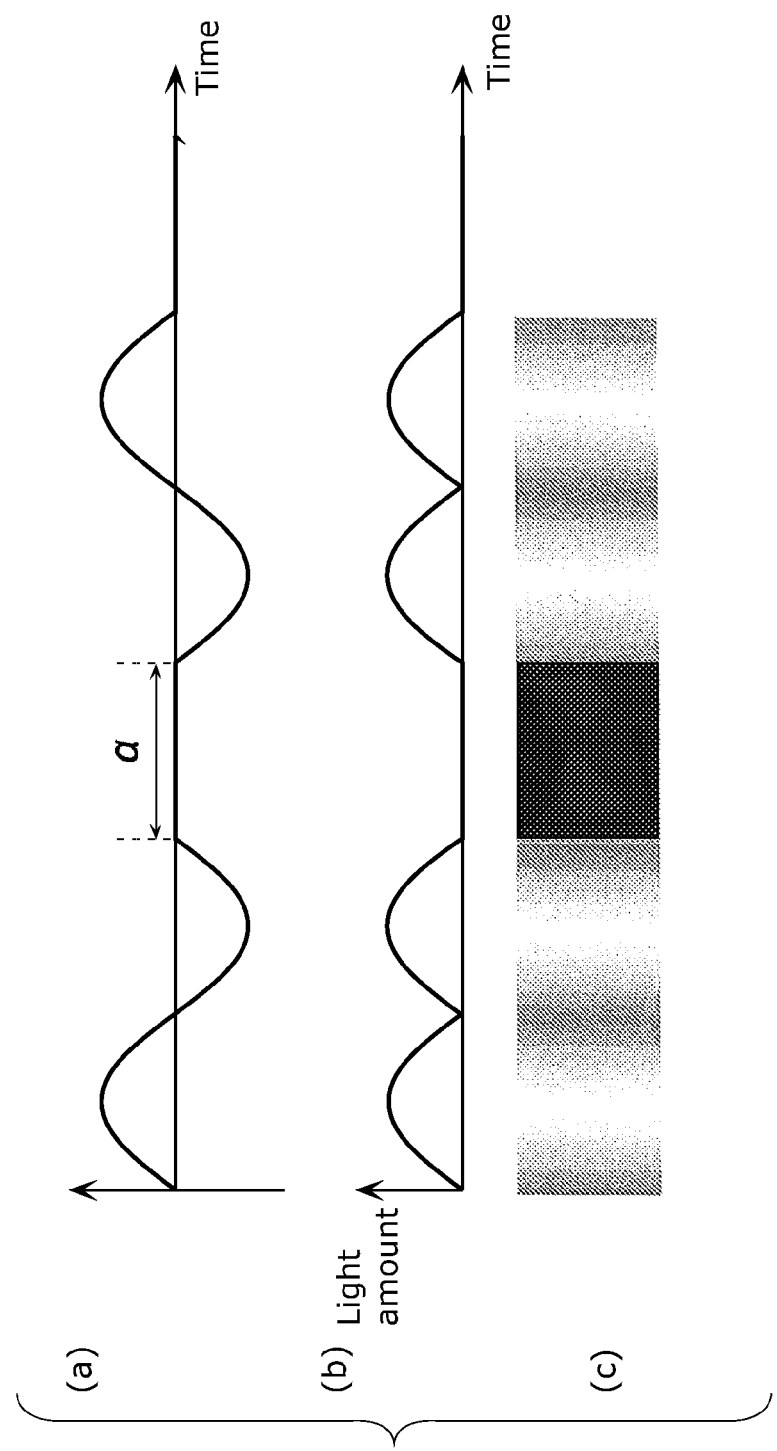
FIG. 3 shows how to overlay information on illuminating light.

FIG. 3 shows how to overlay the information on the illuminating light.

The illustration (a) in FIG. 3 exemplifies an AC voltage with its waveform changed. For example, the power supply control circuit in the illuminating apparatus 50 can generate an AC voltage having the waveform shown in (a) in FIG. 3. As an example, (a) in FIG. 3 shows that the power supply voltage in a period α is 0V.

It is noted that the illuminating apparatus 50 may utilize a technique to change an illuminating scheme and the like in order to generate an AC voltage having the waveform as shown in (a) in FIG. 3.

The illustration (b) in FIG. 3 shows a change in the amount of light emitted from the illuminating apparatus 50 using the AC voltage in (a) in FIG. 3. In (b) in FIG. 3, the information is overlaid on the illuminating light so that a period having the brightness of 0 is defined as "1", and a period having the brightness of not 0 is defined as "0".

It is noted that the overlaying technique shall not be limited to this; instead, a period having the brightness of 0 may be defined as "0", and a period having the brightness of not 0 may be defined as "1".

The illuminating apparatus 50 generates, at a specific period, a waveform corresponding to the period α in (a) in FIG. 3 to successfully overlay the information on the illuminating light.

As described above, the information is overlaid on the illuminating light, depending on a period of the AC voltage; instead, the information may be overlaid on the illuminating light at, for example, any given period.

The illustration (c) in FIG. 3 visualizes how the light amount in (b) in FIG. 3 changes.

Figure 4:
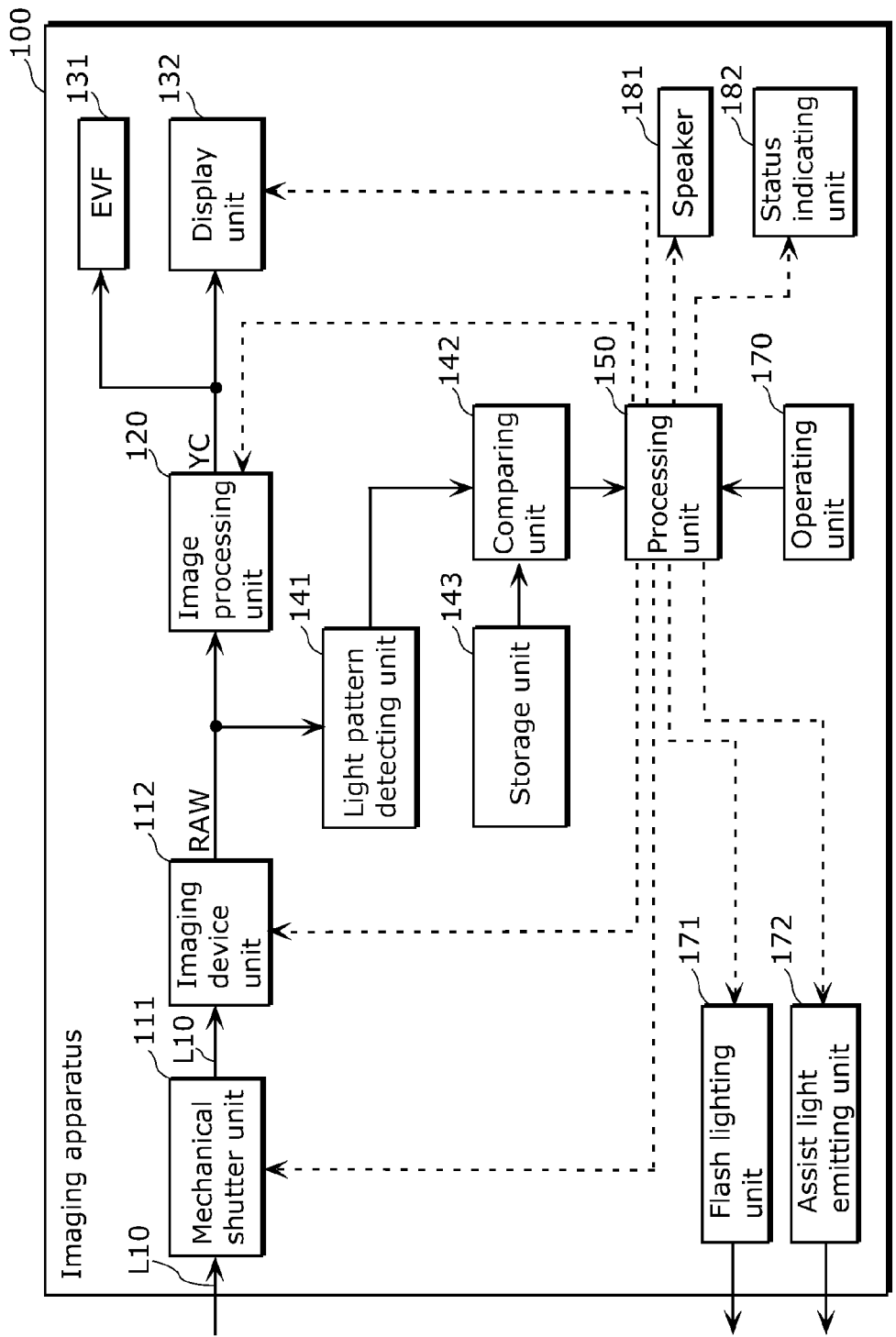
FIG. 4 depicts a block diagram showing a structure of an imaging apparatus.

FIG. 4 depicts a block diagram showing a structure of the imaging apparatus 100.

As shown in FIG. 4, the imaging apparatus 100 includes a mechanical shutter unit 111, an imaging device unit 112, an image processing unit 120, an electronic view finder (EVF) 131, a display unit 132, and a storage unit 143.

The mechanical shutter unit 111 includes a mechanical shutter which blocks light coming from outside. In response to a direction from outside, the mechanical shutter unit 111 opens and closes the mechanical shutter. The mechanical shutter unit 111 opens and closes the mechanical shutter to change the exposure time. Hereinafter, the exposure time based on an operation of the mechanical shutter in the mechanical shutter unit 111 is referred to as a mechanical exposure time.

The imaging device unit 112 includes an image sensor and an analogue-digital (AD) conversion unit. The image sensor is either a complementary metal oxide Semiconductor (CMOS) image sensor or a CCD image sensor. The image sensor includes an electronic shutter. The imaging device unit 112 causes the electronic shutter to change the exposure time. Hereinafter, the exposure time based on the control by the electronic shutter is referred to as an electronic exposure time.

Each of the CMOS image sensor and the CCD image sensor includes multiple color filters arranged in a matrix. The arrangement of the color filters is the Bayer arrangement. It is noted that the arrangement of the color filters shall not be limited to the Bayer arrangement; instead, the color filters may be arranged in another arrangement scheme.

Each of the CMOS image sensor and the CCD image sensor is well known. Thus, the details thereof shall be omitted.

The AD conversion unit converts an analogue signal into a digital signal.

When the shutter of the mechanical shutter unit 111 is open, the image sensor in the imaging device unit 112 receives the light L10.

In the imaging device unit 112, the image sensor converts the received light L10 into an electric signal, and the AD conversion unit converts the electric signal into an s-bit (s is an integer) digital signal (hereinafter referred to as an image signal).

The image signal indicates raw data items each corresponding to one of multiple pictures constituting a moving image. The number of pictures per second in the moving image changes, depending on an electronic exposure time. For example, when the electronic exposure time is 1/30 seconds, 30 pictures per second are included in the moving image. Here, the raw data items indicated in the image signal change every 1/30 seconds.

The imaging device unit 112 transmits the image signal to the image processing unit 120 and to a light pattern detecting unit 141.

The image processing unit 120 carries out image processing N. In the image processing N, the image processing unit 120 performs de-mosaicing on each of the raw data items indicated in the received image signal. Through the image processing, the image processing unit 120 obtains RGB data items each corresponding to one of the raw data items. Then, the image processing unit 120 carries out color conversion processing for obtaining, from each of the RGB data items, a luminance signal and a color-difference signal. Thus, the image processing unit 120 obtains a luminance signal (Y) and a color-difference signal (C) both corresponding to one of the RGB data items.

For each obtainment of the luminance signal and the color-difference signal, the image processing unit 120 transmits the obtained luminance signal and color-difference signal to the EVF 131 and the display unit 132.

It is noted that, the image processing N involves, as necessary, the white balance adjustment, the gamma correction, the gain correction, the distortion correction, scaling, and the like. It is noted that the RGB data items obtained in the image processing N may be transmitted to the EVF 131 and the display unit 132.

The EVF 131 includes a small liquid crystal display (LCD) which uses a backlight to display an image. The EVF 131 displays an image on the LCD. It is noted that the EVF 131 may include a display unit other than the LCD. The EVF 131 displays an image which is based on a luminance signal and a color-difference signal (or a RGB data item) transmitted from the image processing unit 120.

The display unit 132 is an LCD displaying an image, using a backlight. The display unit 132 displays an image. It is noted that the display unit 132 may be a display unit other than the LCD. The display unit 132 displays an image which is based on a luminance signal and a color-difference signal (or a RGB data item) transmitted from the image processing unit 120.

The storage unit 143 is a non-volatile memory. The storage unit 143 may also be a volatile memory (Static Random Access Memory or SRAM). It is noted that the information stored in the storage unit 143 may be read from a not-shown read-only memory (ROM) and stored in the storage unit 143.

The storage unit 143 stores a determination information table T100 used for detecting information overlaid on illuminating light.

It is noted any process may be adopted to store the determination information table T100 in the storage unit 143. For example, the determination information table T100 may be stored in the storage unit 143 via a storage medium. Furthermore, the determination information table T100 transmitted via a communication line and the like may be stored in the storage unit 143. In addition, the determination information table T100 inputted via an input device may be stored in the storage unit 143.

FIG. 5 exemplifies the determination information table T100.

In FIG. 5, "Number" specifies "Determination Code". Here, "Determination Code" is determination information for detecting information overlaid on illuminating light. For example, the determination code is expressed as binary numbers. It is noted that the determination code shall not be limited to binary numbers; instead, the determination code may be expressed as another symbol (alphabet, for example).

In FIG. 5, "Direction" shows a direction which represents a determination code corresponding to the direction. The imaging apparatus 100 carries out processing based on the direction. The details of the processing shall be described later.

The illuminating apparatus 50 stores a direction information table T50 which shows part or all of the determination codes shown in the determination information table T100.

FIG. 6 exemplifies the determination information table T50.

In FIG. 6, "Number" specifies "Direction Code". Here, "Direction Code" is direction information for controlling the imaging apparatus 100. Each of codes under "Direction Code" corresponds to one of the determination codes. For example, the direction code is expressed as binary numbers. It is noted that the direction code shall not be limited to binary numbers; instead, the direction code may be expressed as another symbol (alphabet, for example).

In FIG. 6, "Direction" shows a direction which represents a direction code corresponding to the direction. The determination information table T50 shows two or more direction codes as the direction information; instead, the determination information table T50 may show only one direction code.

Utilizing the technique shown in FIG. 3, for example, the illuminating apparatus 50 overlays on illuminating light all the direction codes in the determination information table T50, and emits the illuminating light. On the illuminating light emitted from the illuminating apparatus 50, all the direction codes in the determination information table T50 are repeatedly overlaid at a predetermined period.

It is noted that not all of the direction codes in the determination information table T50 are overlaid on illuminating light; part of the direction codes may overlaid on the illuminating light.

With reference to FIG. 4 again, the imaging apparatus 100 further includes the light pattern detecting unit 141, a comparing unit 142, a processing unit 150, an operating unit 170, a flash lighting unit 171, an assist light emitting unit 172, a speaker 181, and a status indicating unit 182.

The light pattern detecting unit 141 carries out processing described hereinafter, using an image signal received from the imaging device unit 112. The operation of the light pattern detecting unit 141 shall be detailed later.

The comparing unit 142 carries out processing described hereinafter, using information received from the light pattern detecting unit 141. The operation of the comparing unit 142 shall be detailed later.

The processing unit 150 is a micro processing unit (MPU). It is noted that the processing unit 150 shall not be limited to an MPU; instead, the processing unit 150 may be another circuit capable of calculation, a dedicated circuit executing specific processing, and the like. The processing unit 150 executes a program stored in a not-shown memory to carry out after-described various kinds of processing.

The operating unit 170 includes various buttons and dials for a user to operate. The operating unit 170 detects a user operating status indicating how the buttons and dials are used, and transmits to the processing unit 150 operating information showing the operating status.

The processing unit 150 carries out processing which corresponds to the received operating information. In other word, the operating unit 170 is an interface for the user to operate the imaging apparatus 100. Hereinafter, the operation by the user of the operating unit 170 is also referred to as an operation U.

The flash lighting unit 171 emits a flash of light in imaging in the case where flash photography is allowed.

The assist light emitting unit 172 includes a luminous element, such as an LED and an infrared lamp. In accordance with the control by an after-described assist light control unit 154, the assist light emitting unit 172 emits an assist light, using the luminous element. For example, the assist light is used to assist auto focusing in imaging.

Emission of the assist light to the object makes it possible to increase the amount of the light L10 even though the amount of the light L10 from the object is small.

The speaker 181 outputs audio.

The status indicating unit 182 includes a luminous element, such as an LED. In accordance with the control by an after-described status indication control unit 160, the status indicating unit 182 emits status light using the luminous element. The status light is used for indicating an operating status of the imaging apparatus 100. The status indicating unit 182 indicates the operating status of the imaging apparatus 100 by adjusting a blinking period of the status light, emitted by the luminous element, to a predetermined blinking period. An operating status of the imaging apparatus 100 is, for example, an imaging status.

It is noted that the status indicating unit 182 may include multiple luminous elements. Here, the status indicating unit 182 may indicate the operating status of the imaging apparatus 100, using a combination of light emitted from the luminous elements and the like.

The operation modes of the imaging apparatus 100 includes a still-image mode, a moving image mode, a no-imaging mode, a no-flash-lighting mode, a no-still-image mode, and a no-moving-image mode. Each of the operation modes is valid when set, and invalid when canceled.

The imaging apparatus 100 carries out an operation which corresponds to each of the set operation modes. For example, when the still-image mode and the no-flash-lighting mode are set as operation modes for the imaging apparatus 100, the imaging apparatus 100 carries out operations which correspond the still-image mode and the no-flash-lighting mode.

The still-image mode is used for obtaining a still image. The moving image mode is used for obtaining a moving image.

Part or all the light pattern detecting unit 141 and the comparing unit 142 included in the imaging apparatus 100 may be implemented in the form of hardware, such as a large scale integration (LSI). Moreover, part or all the image processing unit 120, the light pattern detecting unit 141, the comparing unit 142, and the processing unit 150 may be implemented in the form of hardware such as a single LSI.

Furthermore, part or all the light pattern detecting unit 141, the comparing unit 142, and the image processing unit 120 may be implemented in the form of a program module executed by a processor such as a CPU.

Figure 7:
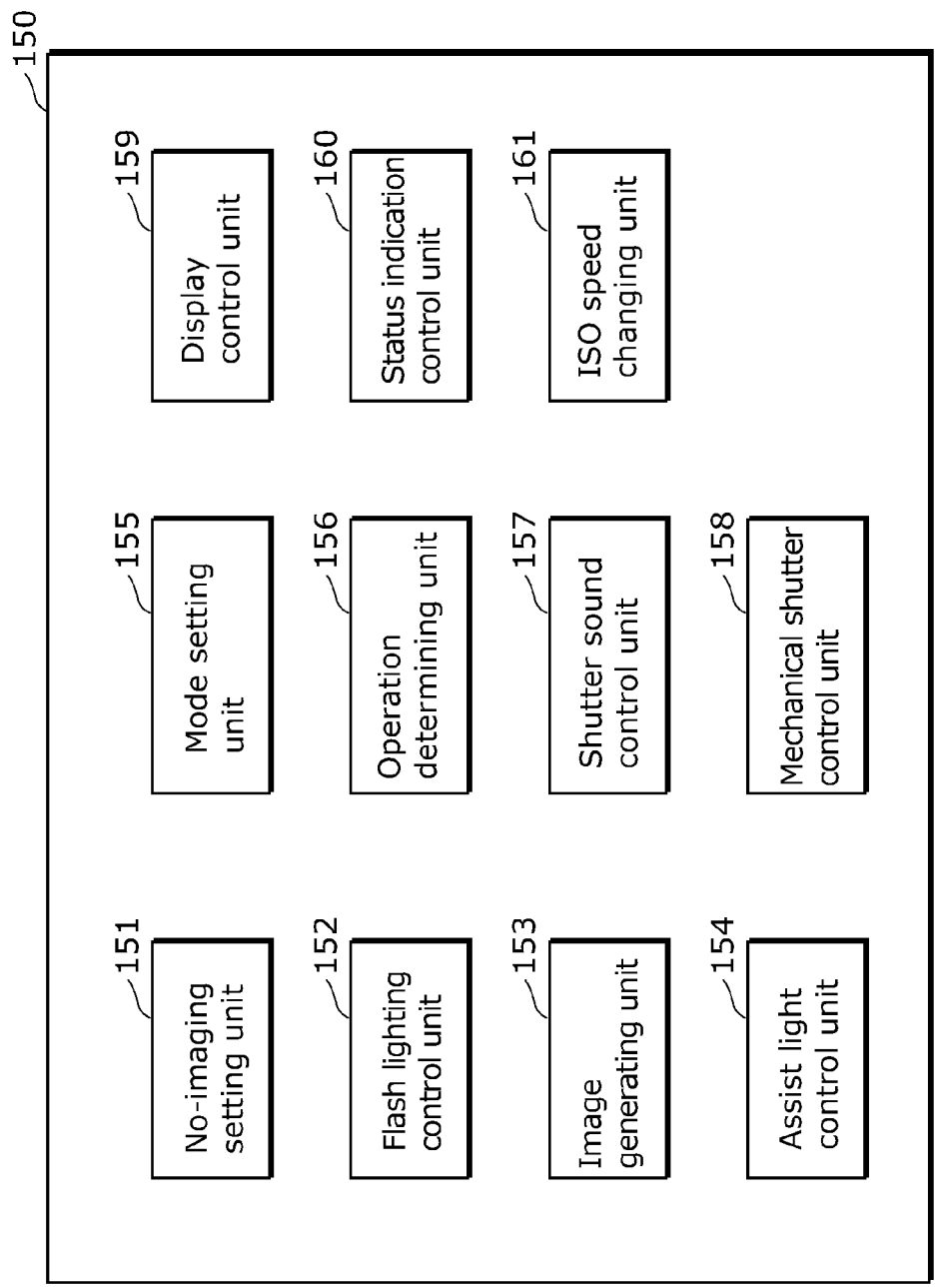
FIG. 7 depicts a block diagram showing a functional structure of a processing unit.

FIG. 7 depicts a block diagram showing a functional structure of the processing unit 150.

The processing unit 150 includes an no-imaging setting unit 151, a flash lighting control unit 152, an image generating unit 153, an assist light control unit 154, a mode setting unit 155, an operation determining unit 156, a shutter sound control unit 157, a mechanical shutter control unit 158, a display control unit 159, a status indication control unit 160, and an ISO speed changing unit 161.

The detailed operations of each of the units included in the processing unit 150 shall be described later.

The mode setting unit 155 sets after-described various modes as operation modes for the imaging apparatus 100. The ISO speed changing unit 161 carries out processing, such as processing for taking a longer exposure time for the imaging device unit 112, processing for adjusting gain, and processing for adjusting gain for the image processing unit 120.

It is noted that part or all of the following units: the no-imaging setting unit 151, the flash lighting control unit 152, the image generating unit 153, the assist light control unit 154, the mode setting unit 155, the operation determining unit 156, the shutter sound control unit 157, the mechanical shutter control unit 158, the display control unit 159, the status indication control unit 160, and the ISO speed changing unit 161, may be implemented in the form of hardware such as an LSI.

Furthermore, part or all of the following units: the no-imaging setting unit 151, the flash lighting control unit 152, the image generating unit 153, the assist light control unit 154, the mode setting unit 155, the operation determining unit 156, the shutter sound control unit 157, the mechanical shutter control unit 158, the display control unit 159, the status indication control unit 160, and the ISO speed changing unit 161, may be a program module executed by the processing unit 150.

Described next is specific processing (hereinafter referred to as lighting handling processing) carried out by the imaging apparatus 100 according to the embodiment. The lighting handling processing is carried out as an operation mode for the imaging apparatus 100 when the still-image mode or the moving image mode is set. For example, each of the still-image mode and the moving image mode is set when the operation U; that is for setting either one of the obtaining modes, is carried out.

When either the still-image mode or the moving image mode is set, the processing unit 150 controls each of the units in the imaging apparatus 100 for imaging. For example, the processing unit 150 transmits a direction to the mechanical shutter unit 111 in order to open the shutter. In accordance with the received direction, the mechanical shutter unit 111 opens the shutter. Hence, the image sensor in the imaging device unit 112 receives the light L10 from the object.

Here, the light L10 includes light which comes from the object subject to illuminating light from the illuminating apparatus 50. In other word, the light L10 includes the illuminating light from the illuminating apparatus 50. Specifically, overlaid on the light L10 is the information overlaid on the illuminating light.

The imaging device unit 112 uses the image sensor to convert the received light L10 into an electric signal, and uses the AD conversion unit to convert the electric signal into the image signal.

The image signal indicates raw data items each corresponding to one of multiple pictures constituting a moving image. The number of pictures per second in the moving image changes, depending on an electronic exposure time. For example, when the electronic exposure time is 1/30 seconds, 30 pictures per second are included in the moving image. Here, the raw data items indicated in the image signal change every 1/30 seconds.

The imaging device unit 112 transmits the image signal to the image processing unit 120 and to the light pattern detecting unit 141.

The image processing unit 120 carries out the image processing N. Hence, a luminance signal and a color-difference signal are transmitted to the EVF 131 and the display unit 132. Each of the EVF 131 and the display unit 132 displays an image based on the received luminance signal and color-difference signal.

The lighting handling processing described below is carried out by the imaging apparatus 100 with either the still-image mode or the moving image mode set when each of the image processing unit 120 and the light pattern detecting unit 141 receives the image signal from the imaging device unit 112.

Figure 8:
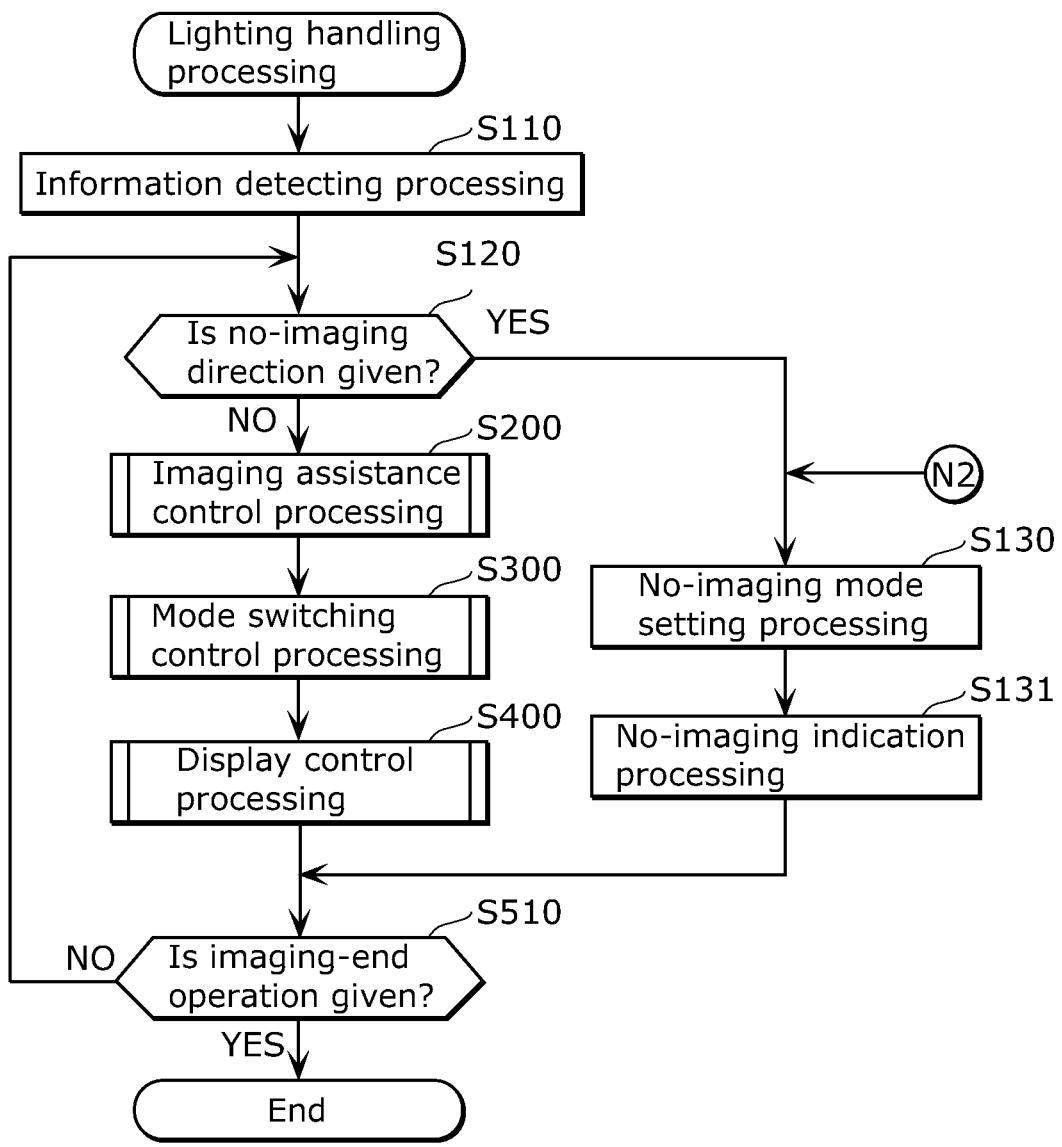
FIG. 8 depicts a flowchart showing lighting handling processing.

FIG. 8 is a flowchart showing lighting handling processing.

In Step S110, information detecting processing is carried out. The information detecting processing involves detecting, from the image signal, information overlaid on the light L10. In other words, the processing involves detecting information overlaid on the illuminating light emitted by the illuminating apparatus 50.

In the information detecting processing, the light pattern detecting unit 141 carries out signal conversion processing. In the signal conversion processing, the light pattern detecting unit 141 performs de-mosaicing on each of the raw data items indicated in the received image signal. Hence, the light pattern detecting unit 141 obtains RGB data items each corresponding to one of the raw data items.

Then, the light pattern detecting unit 141 carries out color conversion processing for obtaining, from each of the RGB data items, a luminance signal and a color-difference signal. Thus, the light pattern detecting unit 141 obtains the luminance signal and the color-difference signal both corresponding to one of the RGB data items. The luminance signal indicates luminance values for multiple pixels which constitute a picture corresponding to one of the raw data items. In other words, based on each of the raw data items, the light pattern detecting unit 141 calculates the luminance values for the pixels which constitute a picture corresponding to one of the raw data items.

Then, the light pattern detecting unit 141 detects the information overlaid on the illuminating light, based on each of the luminance values.

Described here is how to detect, using a CMOS image sensor, the information overlaid on the illuminating light.

For example, the illuminating apparatus 50 is a liner fluorescent lamp. Furthermore, for example, the illuminating apparatus 50 glows with AC voltage having a period of T. In other words, the illuminating apparatus 50 has a low frequency illuminating period of T/2 seconds. Moreover, the image sensor of the imaging device unit 112 is a CMOS image sensor.

The CMOS image sensor can read data for each pixel. Hence, in one picture, the timing of reading data varies for each of the pixels. Thus, in order to detect the change of the illuminating light emitted by the liner fluorescent lamp with the CMOS image sensor, the electronic exposure time needs to be set one of (i) as long as or shorter than a low frequency illuminating period and (ii) at least twice as long as or longer than the low frequency illuminating period. When the electronic exposure time is equal to or shorter than the low frequency illuminating period, a light-dark difference develops for each field or each frame, as seen in the CCD image sensor.

Described here is the case where the electronic exposure time is set at least twice as long as the low frequency illuminating period or longer. For the sake of simplicity, the electronic exposure time is to be 2 T seconds which is four times as long as the low frequency illuminating period of T/2 seconds.

Here, the after-described picture P100 is one of the pictures indicated in the luminance signal obtained by the light pattern detecting unit 141 in the information detecting processing.

Figure 9:
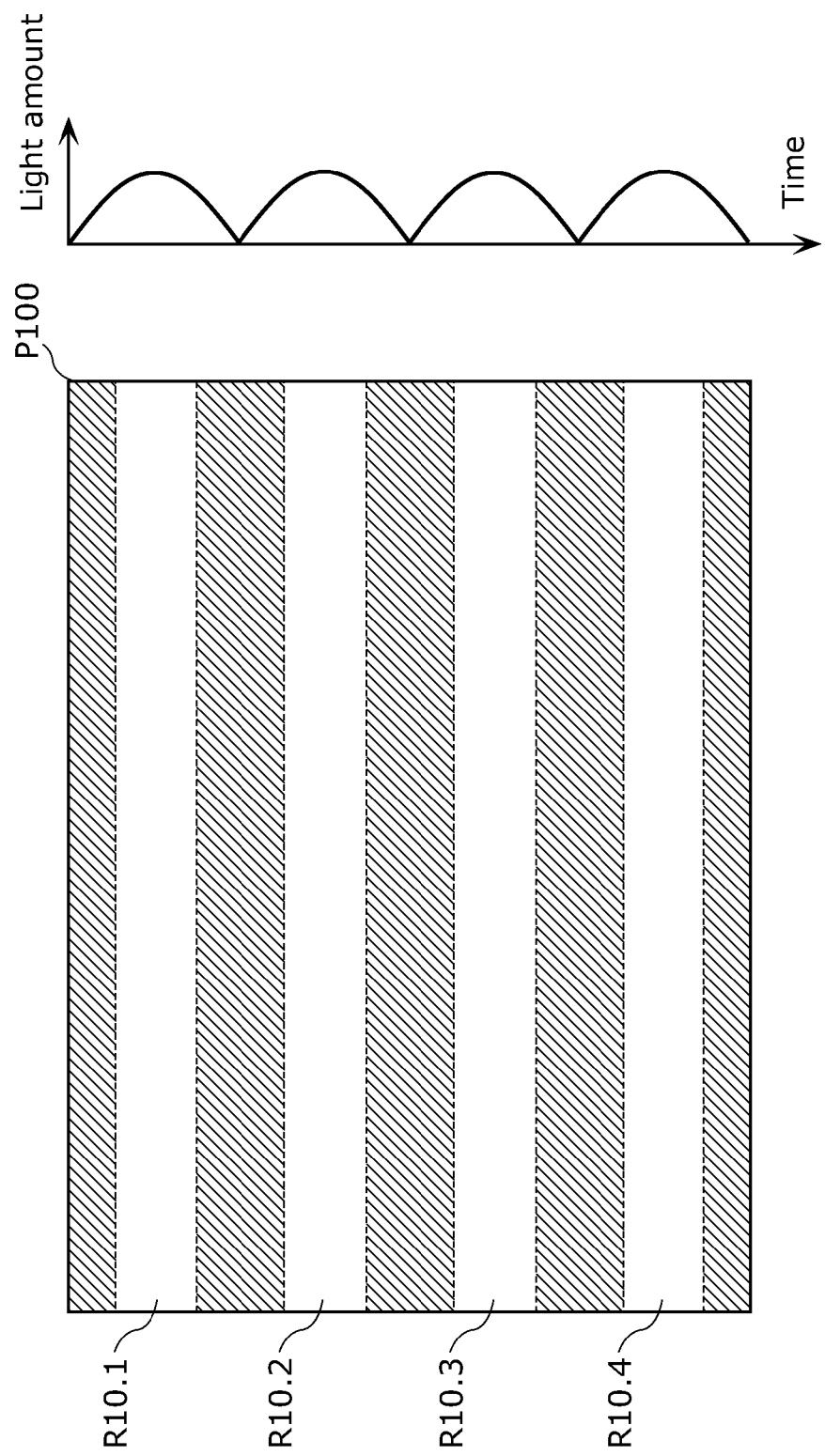
FIG. 9 exemplifies a picture.

FIG. 9 exemplifies the picture P100. It is noted that, the picture P100 actually shows an image of the object. For the sake of description, however, no image of the object is shown in the picture.

Shown on the right of FIG. 9 is how the amount of the illuminating light whose period is T/2 changes when the vertical direction of the picture P100 represents time.

Here, for the picture P100, the light pattern detecting unit 141 sets, as a determination area, an area corresponding to a part where the amount of the illuminating light is equal to or larger than a predetermined value. The determination area is used for detecting information.

When the electronic exposure time is k times (k is an integer equal to or greater than 2) as long as the low frequency illuminating period, as many as k determination areas are set in the picture P100. In the k determination areas, intervals between two neighboring determination areas in a vertical direction are the same.

When k is 4, for example, there are four determination areas; namely R10.1, R10.2, R10.3, and R10.4, set in the picture P100 as shown in FIG. 9. Hereinafter, each of the determination areas R10.1, R10.2, R10.3, and R10.4 is also referred to as a determination area R10.

It is noted that when the electronic exposure time is, for example, eight times as long as the low frequency illuminating period, eight determination areas are set in the picture P100.

Here, the picture P100 is a picture when no information is overlaid on the illuminating light.

Here, each determination area R10 is a high brightness area. In the high brightness area, an average luminance value of the pixels in the determination area R10 is equal to or greater than a predetermined determination threshold value. In other words, the high brightness area is bright. Here, the determination threshold value is used for detecting the information.

Suppose an average luminance value of the pixels in a determination area is smaller than the determination threshold value. Hereinafter, such a determination area is referred to as a low brightness area.

When the information is overlaid on the illuminating light, each determination area R10 in the picture P100 is either the high brightness area or the low brightness area. Here, the picture P100 shows a light-dark pattern.

Suppose the high brightness area and the low brightness area are defined as "0" and "1", respectively. Here, in order to detect "0" and "1", the light pattern detecting unit 141 determines whether or not an average luminance value of the pixels in each determination area R10 in the picture P100 is equal to or greater than the determination threshold value. In other words, the light pattern detecting unit 141 determines the information overlaid on the illuminating light for at least every two or more lines in the picture P100.

In other words, the light pattern detecting unit 141 detects states of luminance values corresponding to the picture P100 as the light-dark pattern in order to detect the information overlaid on the illuminating light. Each of the luminance values is obtained from the image signal. In other words, the light pattern detecting unit 141 detects a light-dark pattern from the image signal in order to detect the information overlaid on the illuminating light.

Suppose overlaid on the illuminating light is, for example, a direction code "1000" used as direction information. Here, the determination areas R10.1, R10.2, R10.3, and R10.4 are a low brightness area, a high brightness area, a high brightness area, and a high brightness area, respectively.

Here, in order to detect the direction code "1000", the light pattern detecting unit 141 determines whether or not an average luminance value of the pixels in each determination area R10 in the picture P100 is equal to or greater than the determination threshold value.

Using the technique described above, the light pattern detecting unit 141 detects a light-dark pattern from the image signal in order to detect the information overlaid on the illuminating light. It is noted that the above description exemplifies the case where the information is detected from one picture; instead, the information may be detected from two or more pictures in the case where there is much information overlaid on the illuminating light.

It is noted that the value for detecting the information shall not be limited to an average luminance value of the pixels in the determination area R10; instead, the value may be a luminance variance of the pixels in the determination area R10. Moreover, the information detecting technique shall not be limited to the above technique. For example, the number of developed low brightness areas may be calculated in a predetermined time to detect the information.

Described next is how to detect, using a CCD image sensor, the information overlaid on the illuminating light.

For example, the illuminating apparatus 50 is a liner fluorescent lamp. Furthermore, for example, the illuminating apparatus 50 glows with AC voltage having a period of T. In other words, the illuminating apparatus 50 has a low frequency illuminating period of T/2 seconds. Moreover, the image sensor of the imaging device unit 112 is a CCD image sensor.

The CCD image sensor reads data for each picture. Thus, the exposure time (electric exposure time) for a picture is the same for each pixel. Hence, in order to detect information from the image signal, two or more pictures are required.

Thus, in order to detect the change of the illuminating light emitted by the liner fluorescent lamp with the CCD image sensor, the electronic exposure time needs to be set at least as short as or shorter than ½ of the low frequency illuminating period. For the sake of simplicity, the electronic exposure time is to be T/8 seconds which is ¼ times as short as the low frequency illuminating period of T/2 seconds.

Figure 10:
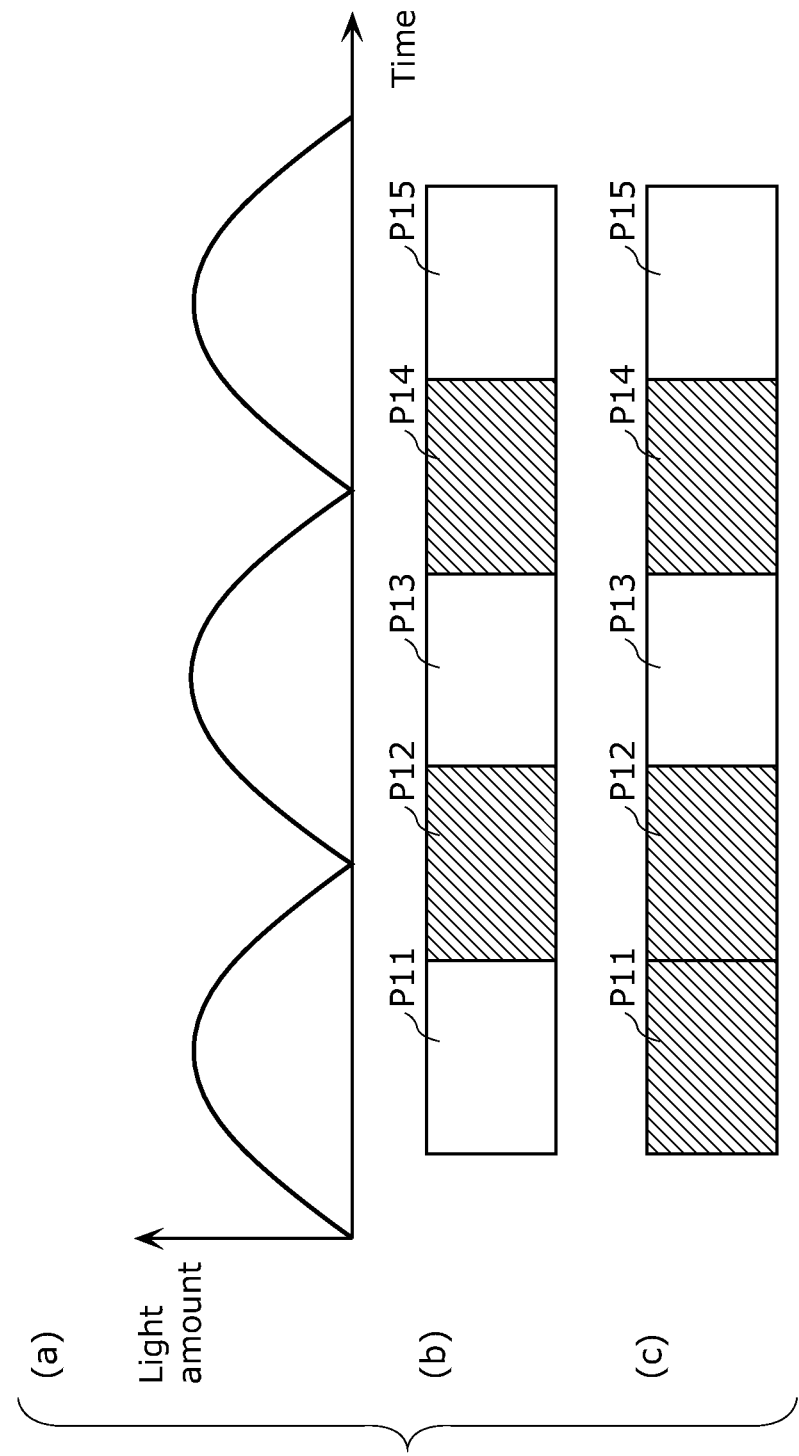
FIG. 10 shows how to detect information overlaid on the illuminating light, based on multiple pictures.

Here, the pictures illustrated in FIG. 10 are those indicated in a luminance signal obtained by the light pattern detecting unit 141 in the information detecting processing.

FIG. 10 shows how to detect information overlaid on the illuminating light, based on multiple pictures.

The illustration (a) in FIG. 10 shows a change in the amount of illuminating light whose period is T/2.

The illustration (b) in FIG. 10 shows some of the pictures indicated in the luminance signal obtained in the information detecting processing. The pictures shown here are pictures P11, P12, P13, P14, and P15. It is noted that, each of the pictures P11 to P15 actually shows an image of the object. For the sake of description, however, no image of the object is shown in the pictures.

The pictures P11, P12, P13, P14, and P15 are generated in this order. In other words, the picture P15 is generated after the picture P11.

Each of the pictures P11, P12, P13, P14, and P15 corresponds to the time axis of (a) in FIG. 10.

For the pictures P11, P12, P13, P14, and P15, the light pattern detecting unit 141 sets, as a determination picture, a picture corresponding to a part having a predetermined amount or more of the illuminating light. The determination picture is used for detecting the information. Here, the pictures P11, P12, P13, P14, and P15 in (b) in FIG. 10 are ones when no information is overlaid on the illuminating light.

As an example, suppose the case where odd-numbered pictures are set as determination pictures. Specifically, as an example, suppose the case where the pictures P11, P13, and P15 are set as determination pictures.

Here, each of the pictures P11, P13, and P15 is a high brightness picture. Each high brightness picture is an area where an average luminance value of the pixels constituting the determination picture is equal to or greater than a predetermined determination threshold value P. In other words, the high brightness picture is bright overall. Here, the determination threshold value P is used for detecting the information.

Suppose an average luminance value of the pixels constituting a determination picture is smaller than the determination threshold value P. Hereinafter, such a determination picture is referred to as a low brightness picture.

The illustration (c) in FIG. 10 shows pictures when the information is overlaid on the illuminating light.

When the information is overlaid on the illuminating light, each of the determination pictures is either a high brightness picture or a low brightness picture. Here, the determination pictures show a light-dark pattern.

Suppose a high brightness picture and a low brightness picture are defined as "0" and "1", respectively. Here, in order to detect "0" and "1", the light pattern detecting unit 141 determines whether or not an average luminance value of the pixels constituting each of the determination pictures is equal to or greater than the determination threshold value P.

In other words, in order to detect the information overlaid on the illuminating light, the light pattern detecting unit 141 detects, as the light-dark pattern, states of luminance values each corresponding one of the pictures. Each of the luminance values is obtained from the image signal. In other words, the light pattern detecting unit 141 detects a light-dark pattern from the image signal in order to detect the information overlaid on the illuminating light.

Suppose overlaid on the illuminating light is, for example, a direction code "100" used as direction information. Here, the picture P11, the picture P13, and the picture P15 as the determination pictures are a low brightness picture, a high brightness picture, and a high brightness picture, respectively.

The light pattern detecting unit 141 determines whether or not an average luminance value of the pixels constituting each of the determination pictures (the picture P11, for example) is greater than the determination threshold value P. Thus, the light pattern detecting unit 141 detects the direction code "100".

It is noted when each picture is processed by the interlaced scan, the picture is in either a odd-numbered field or an even-numbered field. Thus, the information overlaid on the illuminating light is detected for each field. Here, the low frequency illuminating period is longer than a period for each field in the image signal. In other words, the period for each field in the image signal is made shorter than the low frequency illuminating period so that the information overlaid on the illuminating light is successfully detected.

When each picture is processed by the progressive scan, the information overlaid on the illuminating light is detected for each frame. Here, the low frequency illuminating period is longer than a period for each frame in the image signal. In other words, the period for each frame in the image signal is made shorter than the low frequency illuminating period so that the information overlaid on the illuminating light is successfully detected.

Using the technique described above, the light pattern detecting unit 141 detects a light-dark pattern from the image signal in order to detect the information overlaid on the illuminating light.

It is noted that the value for detecting the information shall not be limited to an average luminance value of the pixels constituting each of the determination pictures; instead, the value may be a luminance variance of the pixels constituting the determination picture.

Moreover, the information detecting technique shall not be limited to the above technique. For example, the number of developed low brightness pictures may be calculated in a predetermined time to detect the information.

Using the above techniques, the information overlaid on the illuminating light is detected by either the CMOS image sensor or the CCD image sensor.

In the information detecting processing of Step S110 in FIG. 8, the light pattern detecting unit 141 detects all the direction codes as the direction information overlaid on the illuminating light, using the above technique. Then, the light pattern detecting unit 141 transmits all the detected direction codes to the comparing unit 142.

Then, the processing proceeds to Step S120.

Step S120 involves determining whether or not a no-imaging direction is given to prohibit image obtainment. Specifically, the comparing unit 142 determines whether or not any given direction code (direction information) among all the received direction codes matches with a determination code corresponding to a direction "No imaging" indicated in the determination information table T100 in FIG. 5. In other words, the comparing unit 142 compares all the direction codes as the direction information with a determination code as determination information to determine whether or not detection information matches with the determination information. In other word, in the processing in Step S120, the comparing unit 142 compares the detection information detected in the processing in Step S110 with predetermined determination information.

The determination code corresponding to the direction "No imaging" indicates a direction to prohibit imaging. A determination result obtained by the comparing unit 142 is provided to the processing unit 150.

If NO in Step S120, the processing proceeds to Step S200. If YES in Step S120, the processing proceeds to after-described Step S130.

When the no-imaging direction is given, the direction includes after-described no-still-image and no-moving-image directions. When the no-imaging direction is not given, the direction includes at least one of the after-described no-still-image and no-moving-image directions.

In Step S200, imaging assistance control processing is carried out.

Figure 11:
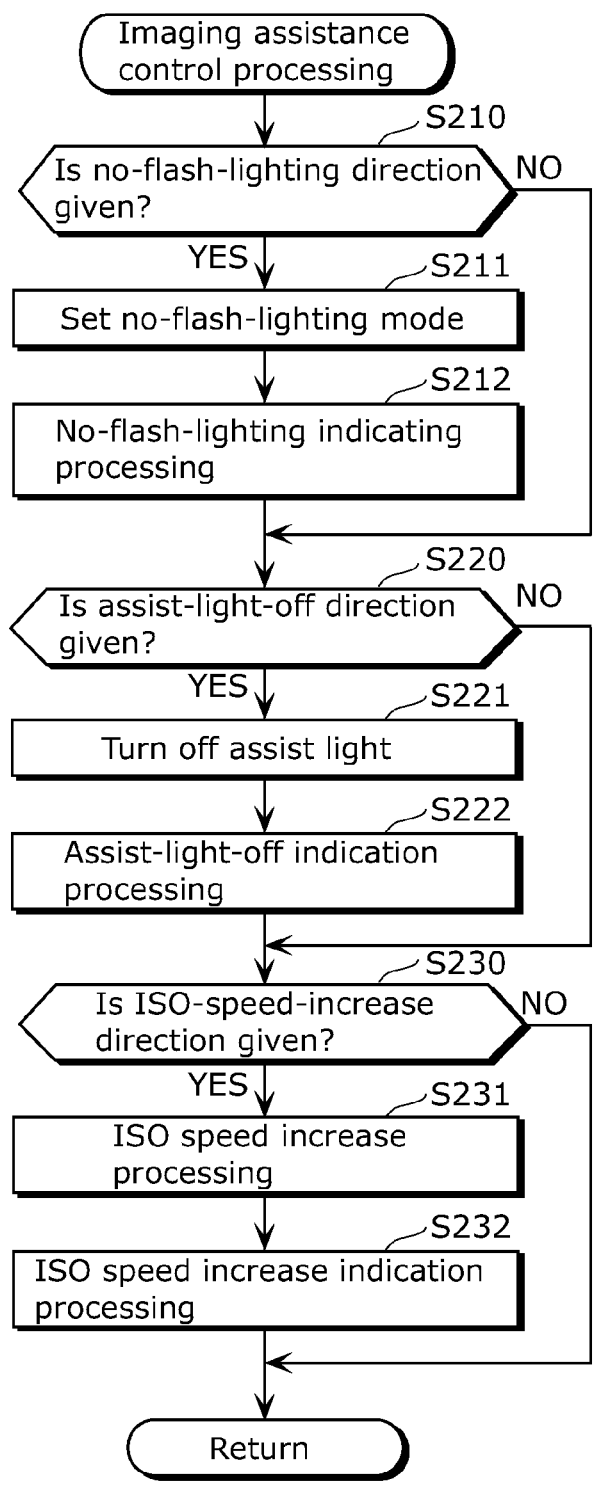
FIG. 11 depicts a flowchart showing imaging assistance control processing.

FIG. 11 depicts a flowchart showing imaging assistance control processing.

Step S210 involves determining whether or not a no-flash-lighting direction is given to prohibit producing a flash of light. Specifically, the comparing unit 142 determines whether or not any given direction code (direction information) among all the received direction codes matches with a determination code corresponding to a direction "No flash lighting" indicated in the determination information table T100. The determination code corresponding to the direction "No flash lighting" indicates a direction to prohibit producing a flash of light in imaging. A determination result obtained by the comparing unit 142 is provided to the processing unit 150.

If YES in Step S210, the processing proceeds to Step S211. If NO in Step S210, the processing proceeds to after-described Step S220.

In Step S211, the flash lighting control unit 152 causes the flash lighting unit 171 to turn off the flash of light in imaging. Specifically, in Step S211, the no-flash-lighting mode is set as an operation mode for the imaging apparatus 100 so that the flash lighting is not allowed. Hence, the flash lighting unit 171 does not produce the flash of light in imaging.

Step S212 involves no-flash-lighting indication processing. In the no-flash-lighting indication processing, the image generating unit 153 generates a specific image A showing a message that producing the flash of light is prohibited. For example, the message may be "No flash photography allowed".

The image generating unit 153 transmits the generated specific image A to the display unit 132. The display unit 132 displays the received specific image A. It is noted that the specific image A may be displayed on the EVF 131.

It is noted that the specific image (the specific image A, for example) may be superimposed on an image on which the display unit 132 is displaying.

Step S220 involves determining whether or not an assist-light-off direction is given for turning off the assist light in imaging. Specifically, the comparing unit 142 determines whether or not any given direction code (direction information) among all the received direction codes matches with a determination code corresponding to a direction "Assist light off" indicated in the determination information table T100. The determination code corresponding to the direction "Assist light off" indicates a direction to turn off the assist light in imaging. A determination result obtained by the comparing unit 142 is provided to the processing unit 150.

If YES in Step S220, the processing proceeds to Step S221. If NO in Step S220, the processing proceeds to after-described Step S230.

In Step S221, the assist light control unit 154 transmits a direction to the assist light emitting unit 172 so that the assist light emitting unit 172 turns off the assist light. On receiving the direction, the assist light emitting unit 172 turns off the assist light. In other words, the assist light control unit 154 causes the assist light emitting unit 172 to turn off the assist light in imaging.

Step S222 involves assist-light-off indication processing. In the assist-light-off indication processing, the image generating unit 153 generates a specific image B showing a message that the assist light is off. For example, the message may be "Assist light off". The image generating unit 153 transmits the generated specific image B to display unit 132. The display unit 132 displays the received specific image B. It is noted that the specific image B may be displayed on the EVF 131.

Step S230 involves determining whether or not an ISO-speed-increase direction is given for increasing an ISO speed in imaging. Specifically, the comparing unit 142 determines whether or not any given direction code (direction information) among all the received direction codes matches with a determination code corresponding to a direction "Increase ISO speed" indicated in the determination information table T100. The determination code corresponding to the direction "Increase ISO speed" indicates a direction to increase an ISO speed in imaging. A determination result obtained by the comparing unit 142 is provided to the processing unit 150.

If YES in Step S230, the processing proceeds to Step S231. If NO in Step S230, the imaging assistance control processing ends. The processing goes back to the lighting handling processing, and proceeds to Step S300.

The ISO-speed-increase direction is given, for example, to compensate for an insufficient light amount when the no-flash-lighting direction and the like is given.

Step S231 involves the ISO speed increase processing. In the ISO speed increase processing, the ISO speed changing unit 161 causes the imaging device unit 112 to make an exposure time for the imaging device unit 112 longer than the currently set exposure time.

Moreover, the ISO speed changing unit 161 causes the imaging device unit 112 to increase the gain in AD conversion. Furthermore, the ISO speed changing unit 161 causes the image processing unit 120 to increase the gain in the gamma correction and the gain correction in the image processing N.

In other words, the ISO speed changing unit 161 performs control to increase an ISO speed in imaging.

This operation makes it possible to obtain a good image even though the amount of the light L10 is insufficient.

It is noted that, when a direction is given to decrease the ISO speed instead of increasing the ISO speed, the ISO speed changing unit 161 may follow the direction and decrease the ISO speed in imaging.

Step S232 involves the ISO speed increase indication processing. In the ISO speed increase indication processing, the image generating unit 153 generates a specific image C showing a message that the ISO speed is increased. For example, the message may be "ISO speed increased".

The image generating unit 153 transmits the generated specific image C to the display unit 132. The display unit 132 displays the received specific image C. It is noted that the specific image C may be displayed on the EVF 131.

It is noted that the direction code may indicate a direction to correct the image signal or the luminance signal. Such a direction makes it possible to reduce an effect due to a luminance signal variation caused by flicker.

Hence, the imaging assistance control processing ends. The processing goes back to the lighting handling processing in FIG. 8, and proceeds to Step S300.

Step S300 involves the mode switching control processing.

Figure 12:
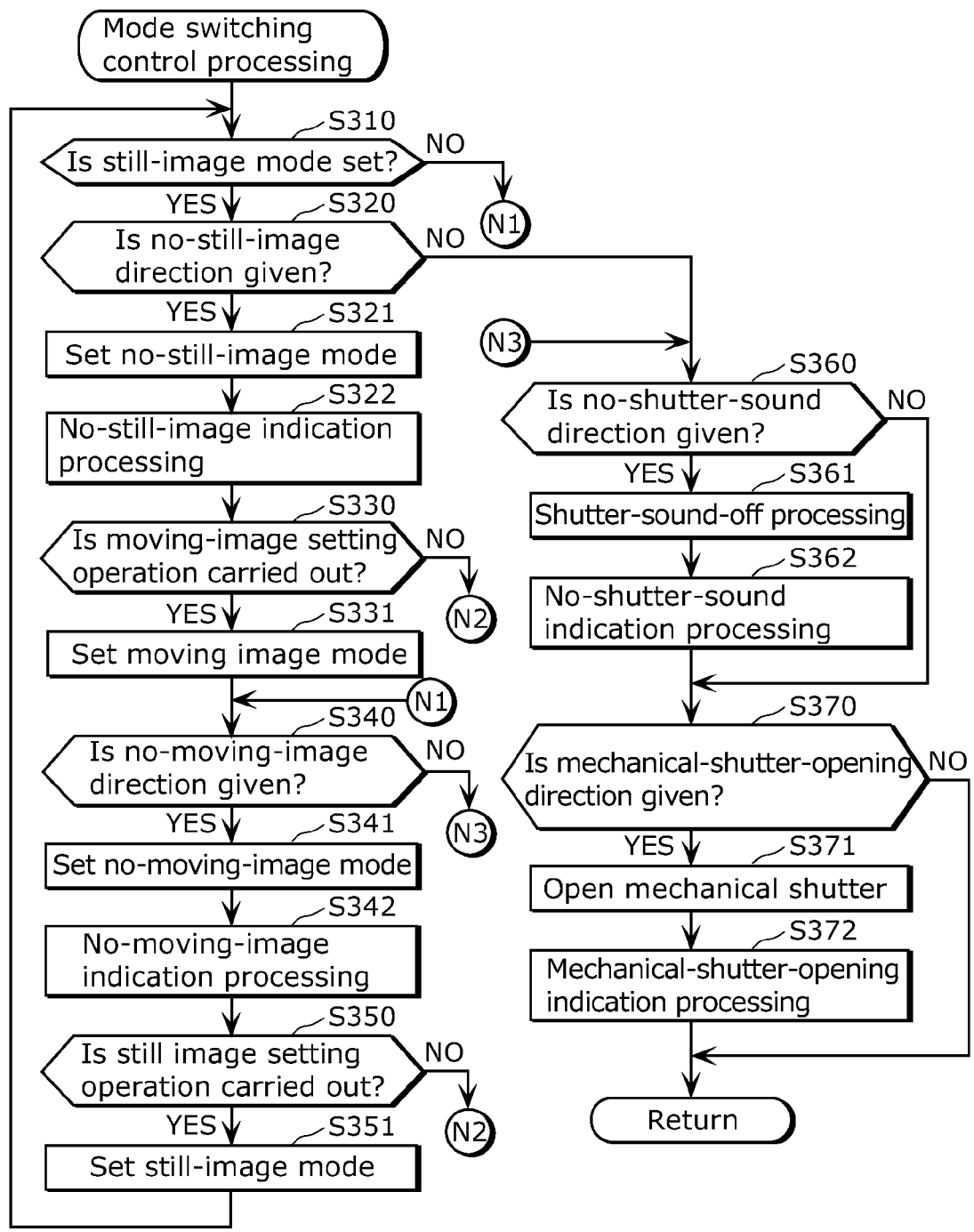
FIG. 12 depicts a flowchart showing mode switching control processing.

FIG. 12 depicts a flowchart showing mode switching control processing.

In Step S310, the mode setting unit 155 determines whether or not the still-image mode is set as an operation mode for the imaging apparatus 100. If YES in Step S310, the processing proceeds to Step S320. If NO in Step S310, the processing proceeds to after-described Step S340.

Step S320 involves determining whether or not the no-still-image direction is given to prohibit obtainment of a still image. Specifically, the comparing unit 142 determines whether or not any given direction code (direction information) among all the received direction codes matches with a determination code corresponding to a direction "No still image" indicated in the determination information table T100. The determination code corresponding to the direction "No still image" indicates prohibition of obtaining a still image. A determination result obtained by the comparing unit 142 is provided to the processing unit 150.

If YES in Step S320, the processing proceeds to Step S321. If NO in Step S320, the processing proceeds to after-described Step S360.

In Step S321, the mode setting unit 155 sets the no-still-image mode as an operation mode for the imaging apparatus 100 not to allow obtainment of a still image. Here, the still-image mode is canceled. Hence, the imaging apparatus 100 is not allowed to obtain a still image.

Step S322 involves no-still-image indication processing. In the no-still-image indication processing, the image generating unit 153 generates an after-described specific image G100 showing a message that obtainment of a still image is prohibited and a message asking the user whether or not to set the moving image mode. The image generating unit 153 transmits the generated specific image G100 to the display unit 132. The display unit 132 displays the received specific image G100.

Figure 13:
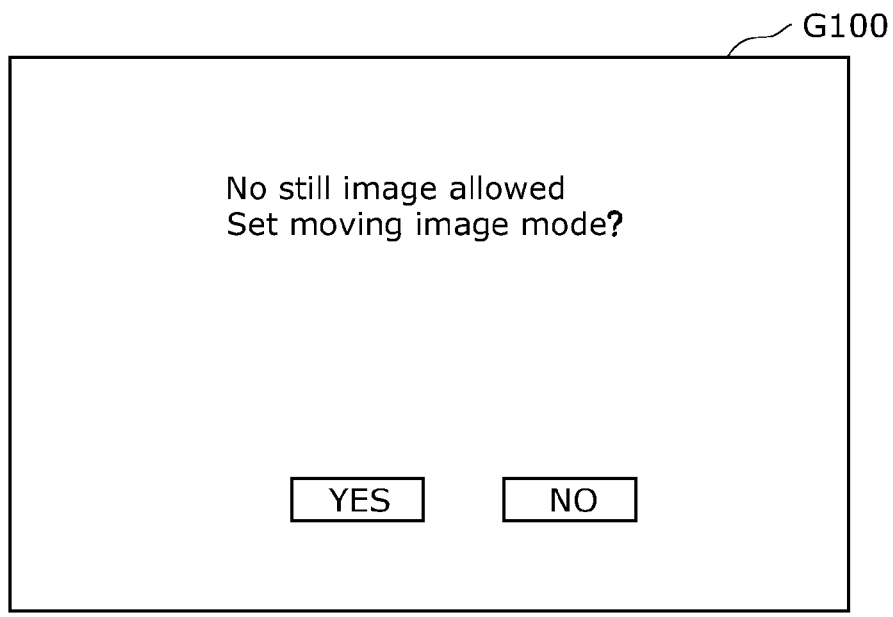
FIG. 13 exemplifies a specific image.

FIG. 13 exemplifies the specific image G100. The specific image G100 shows a message that obtainment of a still image is prohibited. In addition, the specific image G100 shows a message asking the user whether or not to set the moving image mode as an operation mode for the imaging apparatus 100 to obtain a moving image.

With reference to FIG. 12 again, in Step S330, the operation determining unit 156 determines whether or not a moving image setting operation is carried out. The moving image setting operation is the operation U for setting a moving image mode as an operation mode for the imaging apparatus 100. Upon receiving the moving image setting operation, the operating unit 170 transmits to the processing unit 150 operation information indicating the moving image setting operation. Hence, the operation determining unit 156 determines whether or not the moving image setting operation is carried out.

If YES in Step S330, the processing proceeds to Step S331. If NO in Step S330, the processing proceeds to after-described Step S130.

In Step S331, the mode setting unit 155 sets the moving image mode as an operation mode for the imaging apparatus 100. Here, the still-image mode is canceled. When the moving image mode is set, the mechanical shutter unit 111, the imaging device unit 112, and the image processing unit 120 operate for obtaining a moving image.

Step S340 involves determining whether or not the no-moving-image direction is given to prohibit the obtainment of a moving image. Specifically, the comparing unit 142 determines whether or not any given direction code (direction information) among all the received direction codes matches with a determination code corresponding to a direction "No moving image" indicated in the determination information table T100. The determination code corresponding to the direction "No moving image" indicates prohibition of obtaining a moving image. A determination result obtained by the comparing unit 142 is provided to the processing unit 150.

If YES in Step S340, the processing proceeds to Step S341. If NO in Step S340, the processing proceeds to after-described Step S360.

In Step S341, the mode setting unit 155 sets the no-moving-image mode as an operation mode for the imaging apparatus 100 not to allow the obtainment of a moving image. Here, the moving image mode is canceled. Hence, the imaging apparatus 100 is not allowed to obtain a moving image.

Step S342 involves no-moving-image indication processing. In the no-moving-image indication processing, the image generating unit 153 generates an after-described specific image G200 showing a message that obtainment of a moving image is prohibited and a message asking the user whether or not to set the still-image mode. The image generating unit 153 transmits the generated specific image G200 to the display unit 132. The display unit 132 displays the received specific image G200.

Figure 14:
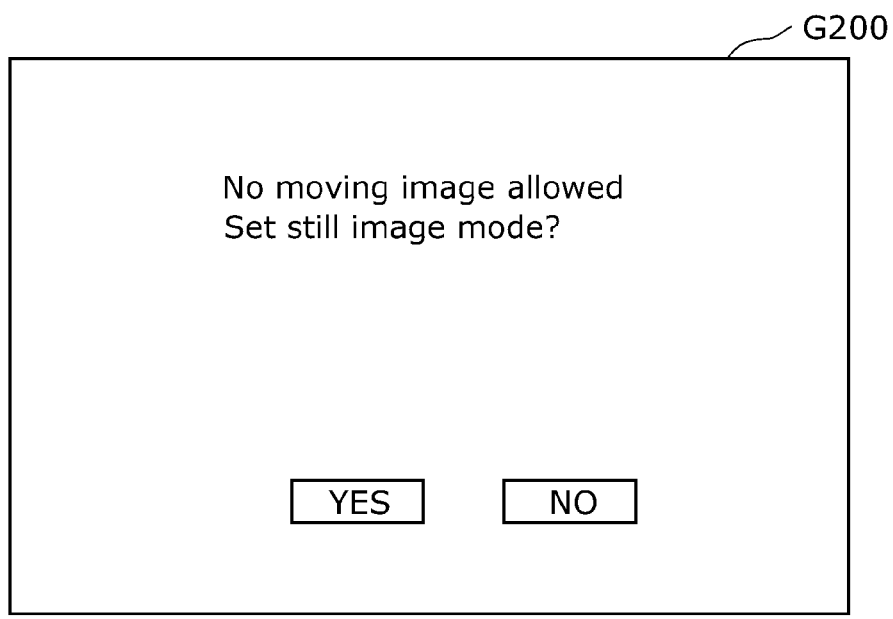
FIG. 14 exemplifies a specific image.

FIG. 14 exemplifies the specific image G200. The specific image G200 shows a message that obtainment of a moving image is prohibited. In addition, the specific image G200 shows a message asking the user whether or not to set the still-image mode as an operation mode for the imaging apparatus 100 to obtain a still image.

With reference to FIG. 12 again, in Step S350, the operation determining unit 156 determines whether or not a still image setting operation is carried out. The still picture setting operation is the operation U for setting a still-image mode as an operation mode for the imaging apparatus 100. Upon receiving the still image setting operation, the operating unit 170 transmits to the processing unit 150 operation information indicating the still image setting operation. Hence, the operation determining unit 156 determines whether or not the still image setting operation is carried out.

If YES in Step S350, the processing proceeds to Step S351. If NO in Step S350, the mode switching control processing ends. The processing goes back to the lighting handling processing in FIG. 8, and proceeds to after-described Step S130.

In Step S351, the mode setting unit 155 sets the still-image mode as an operation mode for the imaging apparatus 100. Here, the moving image mode is canceled. When the still-image mode is set, the mechanical shutter unit 111, the imaging device unit 112, and the image processing unit 120 operate for obtaining a still image.

Then, again, the processing in Step S310 is carried out.

If NO in Step S320, the processing proceeds to Step S360.

It is noted that, as described above, the no-imaging direction is given when the no-still-image direction and the no-moving-image direction are provided. Here, the determination in Step S120 is YES, and the processing proceeds to Step S130. Hence, in the mode switching control processing, no endless repetition of processing continues in Steps S321 and S341.

Step S360 involves determining whether or not a no-shutter-sound direction is given to prohibit outputting the shutter sound. Specifically, the comparing unit 142 determines whether or not any given direction code (direction information) among all the received direction codes matches with a determination code corresponding to a direction "No shutter sound" indicated in the determination information table T100. The determination code corresponding to the direction "No shutter sound" indicates a direction to prohibit outputting shutter sound. A determination result obtained by the comparing unit 142 is provided to the processing unit 150.

If YES in Step S360, the processing proceeds to Step S361. If NO in Step S360, the processing proceeds to after-described Step S370.

Step S361 involves shutter-sound-off processing. In the shutter-sound-off processing, the shutter sound control unit 157 mutes shutter sound coming from the speaker 181. For example, the process turns down the shutter sound transmitted to the speaker 181 to 0. It is noted that mute processing may be carried out, such as reducing the power to the speaker 181. In other words, the shutter sound control unit 157 causes the speaker 181 to mute audio recognized as shutter sound.

Step S362 involves no-shutter-sound indication processing. In the no-shutter-sound indication processing, the image generating unit 153 generates a specific image D showing a message that output of shutter sound is prohibited. For example, the message may be "No shutter sound allowed". The image generating unit 153 transmits the generated specific image D to the display unit 132. The display unit 132 displays the received specific image D. It is noted that the specific image D may be displayed on the EVF 131.

Step S370 involves determining whether or not a mechanical-shutter-opening direction is given for opening the mechanical shutter. Specifically, the comparing unit 142 determines whether or not any given direction code (direction information) among all the received direction codes matches with a determination code corresponding to a direction "Open mechanical shutter" indicated in the determination information table T100. The determination code corresponding to the direction "Open mechanical shutter" indicates a direction to open the mechanical shutter. A determination result obtained by the comparing unit 142 is provided to the processing unit 150.

If YES in Step S370, the processing proceeds to Step S371. If NO in Step S370, the mode switching control processing ends. The processing goes back to the lighting handling processing in FIG. 8, and proceeds to after-described Step S400.

In Step S371, the mechanical shutter control unit 158 causes the mechanical shutter unit 111 to open the mechanical shutter. Here in Step S371, in order to control object shake developed due to the opening of the mechanical shutter and to achieve appropriate exposure, the imaging device unit 112 controls the electronic shutter as well.

Step S372 involves mechanical-shutter-opening indication processing. In the mechanical-shutter-opening indication processing, the image generating unit 153 generates a specific image E showing a message that the mechanical shutter is open. For example, the message may be "Mechanical shutter open". The image generating unit 153 transmits the generated specific image E to the display unit 132. The display unit 132 displays the received specific image E. It is noted that the specific image E may be displayed on the EVF 131.

Hence, the mode switching control processing ends. The processing goes back to the lighting handling processing in FIG. 8, and proceeds to Step S400.

Step S400 involves the display control processing.

Figure 15:
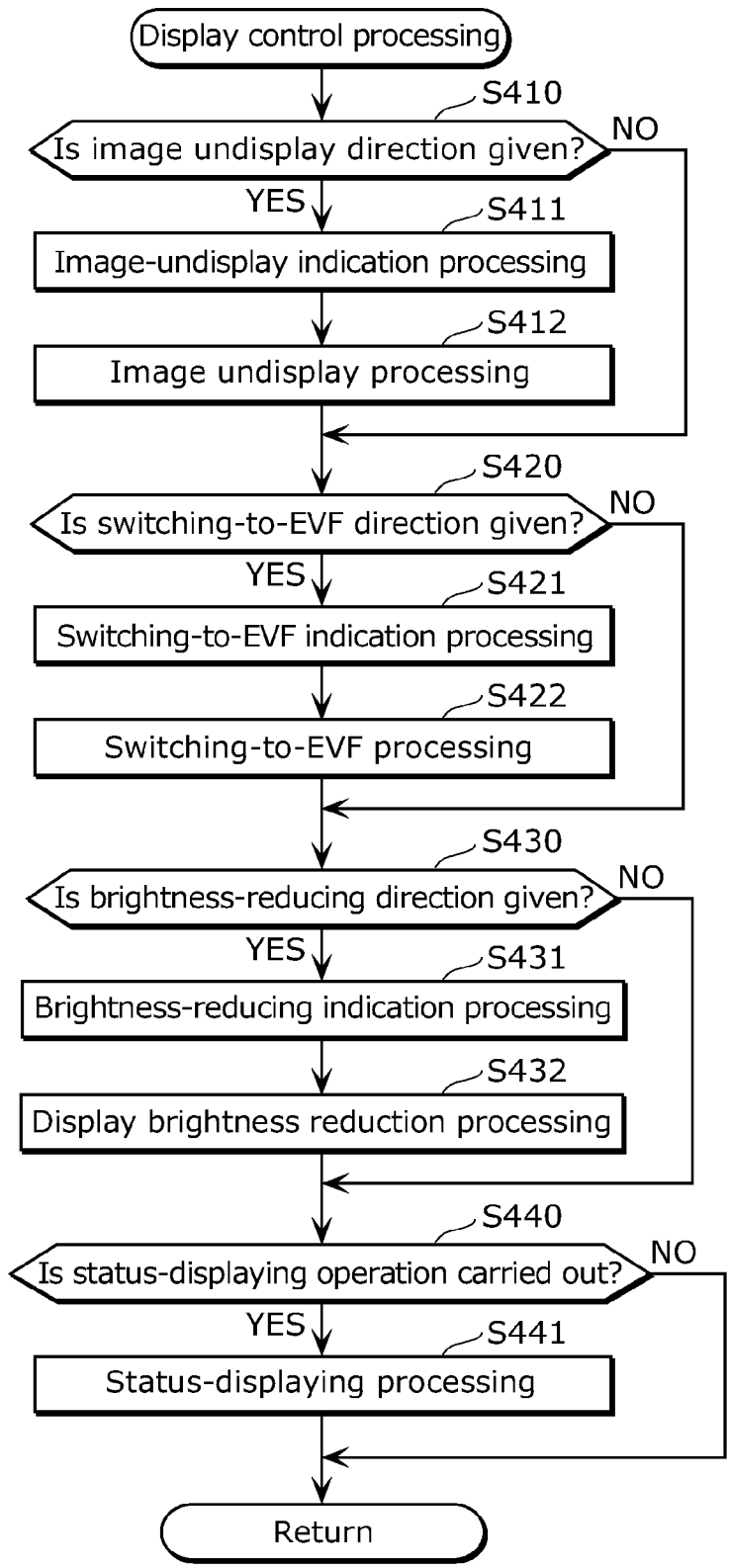
FIG. 15 depicts a flowchart showing display control processing.

FIG. 15 depicts a flowchart showing mode switching control processing.

Step S410 involves determining whether or not an image-undisplay direction is given to undisplay an image. Specifically, the comparing unit 142 determines whether or not any given direction code (direction information) among all the received direction codes matches with a determination code corresponding to a direction "Image undisplayed" indicated in the determination information table T100. The determination code corresponding to the direction "Image undisplayed" indicates a direction for avoiding image display. A determination result obtained by the comparing unit 142 is provided to the processing unit 150.

If YES in Step S410, the processing proceeds to Step S411. If NO in Step S410, the processing proceeds to Step S420.

Step S411 involves image-undisplay indication processing. In the image-undisplay indication processing, the image generating unit 153 generates a specific image F showing a message that an image is to be undisplayed. For example, the message may be "Image to be undisplayed". The image generating unit 153 transmits the generated specific image F to the display unit 132. The display unit 132 displays the received specific image F. It is noted that the specific image F may be displayed on the EVF 131.

Step S412 involves image-undisplay processing. In the image-undisplay processing, the display control unit 159 causes the image processing unit 120 to avoid transmitting a luminance signal and a color-difference signal to each of the EVF 131 and the display unit 132. Hence, the EVF 131 and the display unit 132 do not display an image. Instead of the above processing, for example, a luminance value may be reduced to 0 and the electricity to the EVF 131 and the display unit 132 may be shutting down.

Step S420 involves determining whether or not a switching-to-EVF direction is given. Specifically, the comparing unit 142 determines whether or not any given direction code (direction information) among all the received direction codes matches with a determination code corresponding to a direction "Switching to EVF" indicated in the determination information table T100. The determination code corresponding to the direction "Switch to EVF" shows a direction for switching where the image is to be displayed from the display unit 132 to the EVF 131. A determination result obtained by the comparing unit 142 is provided to the processing unit 150.

If YES in Step S420, the processing proceeds to Step S421. If NO in Step S420, the processing proceeds to after-described Step S430.

Step S421 involves switching-to-EVF indication processing. In the switching-to-EVF indication processing, the image generating unit 153 generates a specific image G showing a message that where the image is to be displayed is switched to the EVF. For example, the message may be "Display switched from main display to EVF to show image". The image generating unit 153 transmits the generated specific image G to the display unit 132. The display unit 132 displays the received specific image G. It is noted that the specific image G may be displayed on the EVF 131.

Step S422 involves switching-to-EVF processing. In the switching-to-EVF processing, the display control unit 159 causes the image processing unit 120 to transmit a luminance signal and a color-difference signal only to the EVF 131, not to the display unit 132. Hence, only the EVF 131, not the display unit 132, displays an image. Moreover, the display control unit 159 causes a not-shown power source not to supply power to the display unit 132.

This operation successfully reduces to the minimum a light leak to the environment.

Here, the imaging apparatus 100 may be equipped with an optical view finder (OVF) instead of the EVF 131. The mechanical shutter unit 111 may be controlled to make the OVF operable so that the OVF can check the object, and the power to the display unit 132 may be stopped.

Step S430 involves determining whether or not a brightness-reducing direction is given for reducing the brightness of the image. Specifically, the comparing unit 142 determines whether or not any given direction code (direction information) among all the received direction codes matches with a determination code corresponding to a direction "Reduce brightness" indicated in the determination information table T100. The determination code corresponding to the direction "Reduce brightness" indicates a direction to reduce the brightness of an image. A determination result obtained by the comparing unit 142 is provided to the processing unit 150.

If YES in Step S430, the processing proceeds to Step S431. If NO in Step S430, the processing proceeds to after-described Step S440.

Step S431 involves brightness-reducing indication processing. In the brightness-reducing indication processing, the image generating unit 153 generates a specific image H showing a message that the brightness of the image is reduced. For example, the message may be "Image brightness to be reduced". The image generating unit 153 transmits the generated specific image H to the display unit 132. The display unit 132 displays the received specific image H. It is noted that the specific image H may be displayed on the EVF 131.

Step S432 involves display brightness reduction processing. In the display brightness reduction processing, the display control unit 159 causes the image processing unit 120 to reduce each of the luminance values indicated in a luminance signal by a predetermined percentage (30%, for example). In other words, the display control unit 159 causes at least one of the display unit 132 and the EVF 131 to reduce the brightness of an image being displayed thereon.

This processing reduces the brightness of an image displayed on each of the display unit 132 and the EVF 131. It is noted that reduction of the brightness shall not be limited to the above operation; instead, the brightness may be reduced by decreasing an amount of light of the backlight of each of the display unit 132 and the EVF 131.

In Step S440, the operation determining unit 156 determines whether or not a status-displaying operation is given. The status-displaying operation is the operation U for indicating an operating status of the imaging apparatus 100. Upon receiving the status-displaying operation, the operating unit 170 transmits to the processing unit 150 operation information indicating the status-displaying operation. Hence, the operation determining unit 156 determines whether or not the status-displaying operation is carried out.

If YES in Step S440, the processing proceeds to Step S441. The status-displaying operation is carried out when, for example, each of the EVF 131 and the display unit 132 does not display an image since the processing in Step S412 is carried out. If NO in Step S440, the display control processing ends. The processing goes back to the lighting handling processing in FIG. 8, and proceeds to after-described Step S510.

Step S441 involves status displaying processing. In the status displaying processing, the status indication control unit 160 causes the status indicating unit 182 to blink the status light at a predetermined period corresponding to an operating status of the imaging apparatus 100.

In other words, the status indicating unit 182 emits blinking status light at a predetermined period using a luminous element in order to indicate to the user the operating status of the imaging apparatus 100. It is noted that emitting the blinking status light at the predetermined period continues, for example, until the operation U is carried out to stop the blinking status light.

The operating status of the imaging apparatus 100 is, for example, when the imaging apparatus 100 is in exposure and the storage medium of the imaging apparatus 100 stores the data. When the storage medium stores the data, the predetermined period is, for example, 0.1 seconds. When the imaging apparatus 100 is in exposure, the predetermined period is, for example, 100 seconds. Here, the luminous element of the status indicating unit 182 almost continues to be on.

Hence, the display control processing ends. The processing goes back to the lighting handling processing in FIG. 8, and proceeds to Step S510.

If one of YES in Step S120, NO in Step S330, and NO in Step S350, the processing proceeds to Step S130.

Step S130 involves no-imaging mode setting processing. In the no-imaging mode setting processing, the mode setting unit 155 sets a no-imaging mode as an operation mode for the imaging apparatus 100 not to allow the obtainment of an image. When the no-imaging mode is set, the units for imaging; namely the mechanical shutter unit 111, the imaging device unit 112, the image processing unit 120, and the like are deactivated. Hence, the imaging apparatus 100 stops an operation for imaging.

Step S131 involves no-imaging indication processing. In the no-imaging indication processing, the image generating unit 153 generates a specific image J showing a message that imaging is prohibited. For example, the message may be "No imaging allowed here". The image generating unit 153 transmits the generated specific image J to the display unit 132. The display unit 132 displays the received specific image J. It is noted that the specific image J may be displayed on the EVF 131. Then, the processing proceeds to Step S510.

In Step S510, the operation determining unit 156 determines whether or not an imaging-end operation is given. The imaging-end operation is the operation U for canceling a set image mode (the moving image mode or the still-image mode). As an operation mode of the imaging apparatus 100, for example, the imaging-end operation is used to set a mode to browse obtained still images and moving images.

Upon receiving the imaging-end operation, the operating unit 170 transmits to the processing unit 150 operating information indicating the imaging-end operation. Hence, the operation determining unit 156 determines whether or not the imaging-end operation is carried out.

If YES in Step S510, the mode setting unit 155 cancels the set image mode (the moving image mode or the still-image mode). The lighting handling processing ends. If NO in Step S510, the processing in Step S120 is resumed.

It is noted that if interrupt processing is given to end the lighting handling processing while the processing in FIGS. 8, 11, 12, and 15 is being executed, the lighting handling processing ends. The interrupt processing is given, for example, to turn off the power of the imaging apparatus 100.

In the embodiment as described above, the light pattern detecting unit 141 detects a light-dark pattern from the image signal in order to detect the information overlaid on the illuminating light. In other words, other than the imaging device unit 112 converting light into the image signal, a feature of the embodiment eliminates the need for a dedicated light receiving element to be used for detecting information overlaid on the light. Hence, the embodiment successfully achieves detection of the information overlaid on light at a low cost.

Moreover, the imaging apparatus 100 carries out various kinds of processing according to a direction indicated in a determination code corresponding to a direction code representing detected direction information. Hence, a feature of the embodiment makes it possible to control imaging apparatus 100 without giving the user extra troubles, depending on a place, a situation in which the illuminating apparatus 50 is installed, and the like. In other words, the feature successfully improves convenience of the imaging apparatus 100.

In imaging at a place where no flash photography is allowed (such as a museum), the imaging apparatus 100 according to the embodiment prevents the user from inadvertently using the flash unit.

In addition, the imaging apparatus 100 does not require a dedicated light-receiving element other than the imaging device unit 112. This feature contributes to preventing an increase in cost when an extra function is added. Moreover, this feature can simplify the structure of an illuminating apparatus.

Furthermore, the embodiment allows the imaging apparatus 100 to selectively perform its imaging functions for imaging an object from which the light L10 comes.

The embodiment makes it possible to detect a light-dark pattern based on a luminance value calculated by an image processing unit. As a result, the number of intended imaging apparatuses can be increased.

The embodiment makes it possible to prevent the imaging apparatus 100 from imaging an object from which the light L10 comes.

The embodiment makes it possible to prevent the imaging apparatus 100 from emitting a flash of light to an object from which the light L10 comes.

The embodiment makes it possible to increase the ISO speed in the imaging of the imaging apparatus 100. This feature contributes to compensating for an insufficient light amount, and obtaining a good image.

The embodiment makes it possible to automatically turn off an assist light emitted from the imaging apparatus 100 to the object from which the light L10 comes.

The embodiment makes it possible to prevent the imaging apparatus 100 from obtaining a still image of the object from which the light L10 comes.

The embodiment makes it possible to prevent the imaging apparatus 100 from obtaining a moving image of the object from which the light L10 comes.

The embodiment makes it possible for the imaging apparatus 100 to mute audio recognized as shutter sound.

The embodiment makes it possible for the imaging apparatus 100 to automatically open a mechanical shutter.

The embodiment makes it possible for the imaging apparatus 100 to reduce the brightness of an image being displayed on a display unit. This feature successfully reduces to the minimum light leak to the environment.

The embodiment makes it possible for a status indicating unit to brink the status light at a predetermined period. This feature successfully lets the user know an operating status of the imaging apparatus.

The embodiment makes it possible to display a specific image for asking the user whether or not to set the moving image mode. This feature allows the user to set the moving image mode easily.

The embodiment makes it possible to display a specific image for asking the user whether or not to set the still-image mode. This feature allows the user to set the still-image mode easily.

The embodiment prevents the display unit 132 from displaying an image, and allows only the EVF 131 to display the image. This feature successfully reduces to the minimum light leak to the environment.

Example of Embodiment

Figure 16:
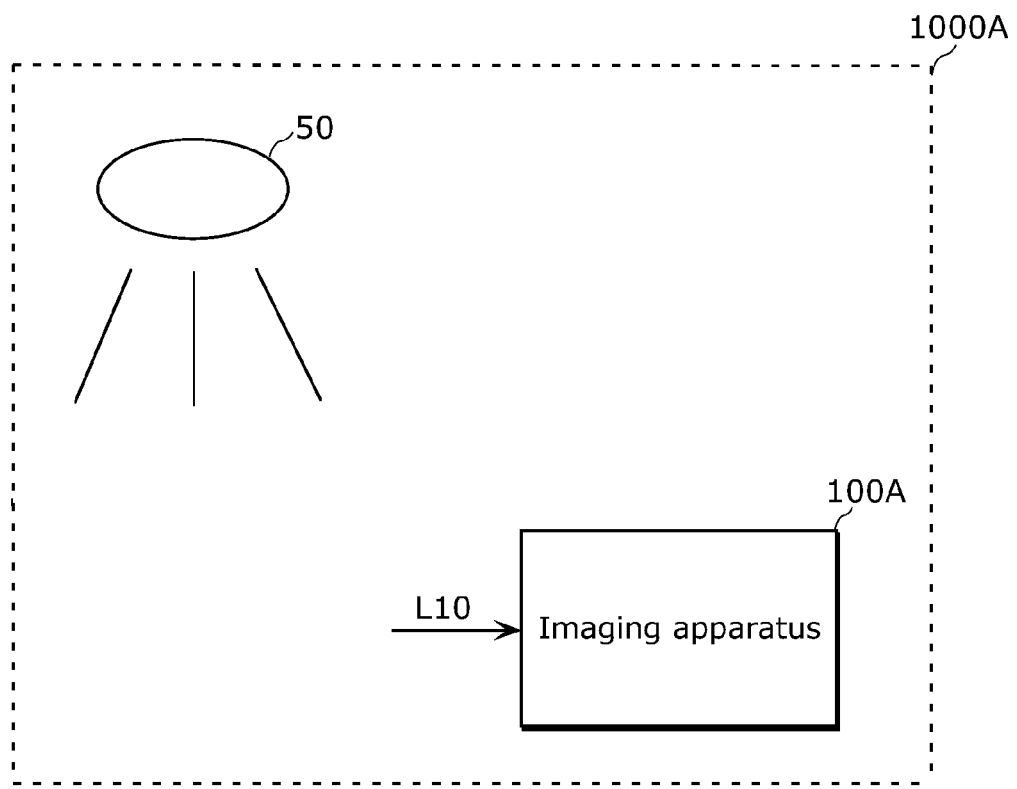
FIG. 16 depicts a block diagram showing a structure of an imaging system according to Example of the embodiment.

FIG. 16 depicts a block diagram showing a structure of an imaging system 1000A according to an example of the embodiment.

According to a comparison, the imaging system 1000A differs from the imaging system 1000 in FIG. 1 in that the imaging system 1000A includes an imaging apparatus 100A instead of the imaging apparatus 100. The structure of the imaging system 1000A other than the above is similar to that of the imaging system 1000. Thus, the details of the imaging system 1000A shall be omitted.

Figure 17:
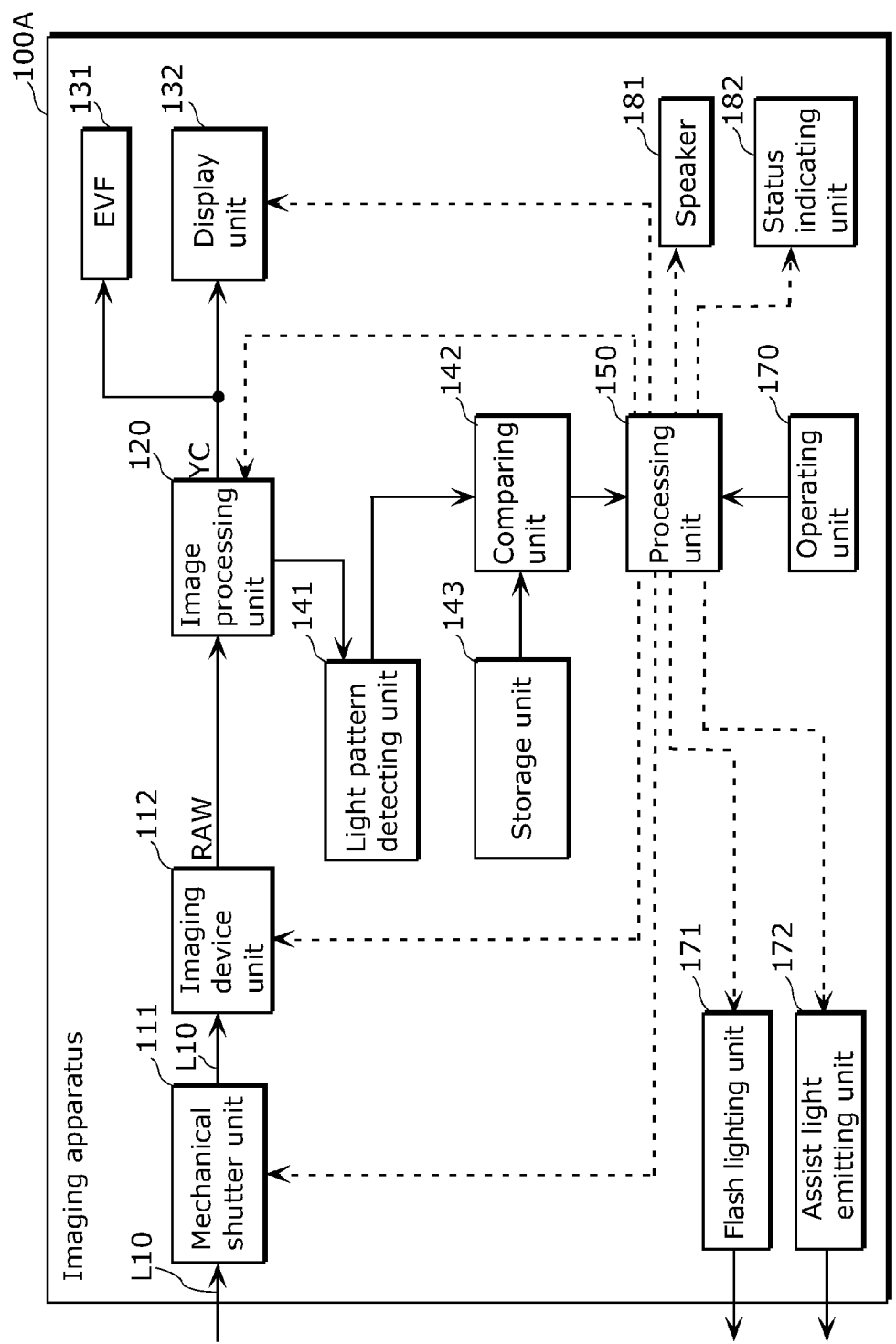
FIG. 17 depicts a block diagram showing a structure of an imaging apparatus.

FIG. 17 depicts a block diagram showing a structure of an imaging apparatus 100A.

The imaging apparatus 100A and the imaging apparatus 100 in FIG. 4 share the same structure. According to a comparison, the processing executed by the imaging device unit 112, the image processing unit 120, and the light pattern detecting unit 141 in the imaging apparatus 100A differs from the processing executed by those in the imaging apparatus 100 in FIG. 4. The processing of units other than the above ones in the imaging apparatus 100A is similar to the processing of equivalent units in the imaging apparatus 100. Thus, the details of the processing shall not be limited.

The imaging device unit 112 transmits the image signal to the image processing unit 120. The image processing unit 120 carries out the image processing N to obtain a luminance signal and a color-difference signal.

For each obtainment of the luminance signal and the color-difference signal, the image processing unit 120 transmits the obtained luminance signal and color-difference signal to the EVF 131 and the display unit 132. The image processing unit 120 also transmits the luminance signal (Y) to the light pattern detecting unit 141.

Described next is specific processing (hereinafter referred to as lighting handling processing A) carried out by the imaging apparatus 100A according to the embodiment. It is noted that hereinafter described is processing which differs from that in the embodiment.

The lighting handling processing A is carried out as an operation mode for the imaging apparatus 100A when the still-image mode or the moving image mode is set.

When either the still-image mode or the moving image mode is set, the processing unit 150 controls, as seen in the embodiment, each of the units in the imaging apparatus 100A for imaging.

As described before, the imaging device unit 112 transmits the image signal to the image processing unit 120. The image processing unit 120 carries out the image processing N to obtain a luminance signal and a color-difference signal. The luminance signal indicates luminance values for multiple pixels which constitute a picture corresponding to one of the raw data items. In other words, based on each of the raw data items, the image processing unit 120 calculates the luminance values for the pixels which constitute a picture corresponding to one of the raw data items.

For each obtainment of the luminance signal and the color-difference signal, the image processing unit 120 transmits the obtained luminance signal (Y) to the light pattern detecting unit 141.

The lighting handling processing A is carried out by the imaging apparatus 100A with either still-image mode or the moving image mode is set when the light pattern detecting unit 141 is receiving the luminance signal (Y) from the image processing unit 120.

Figure 18:
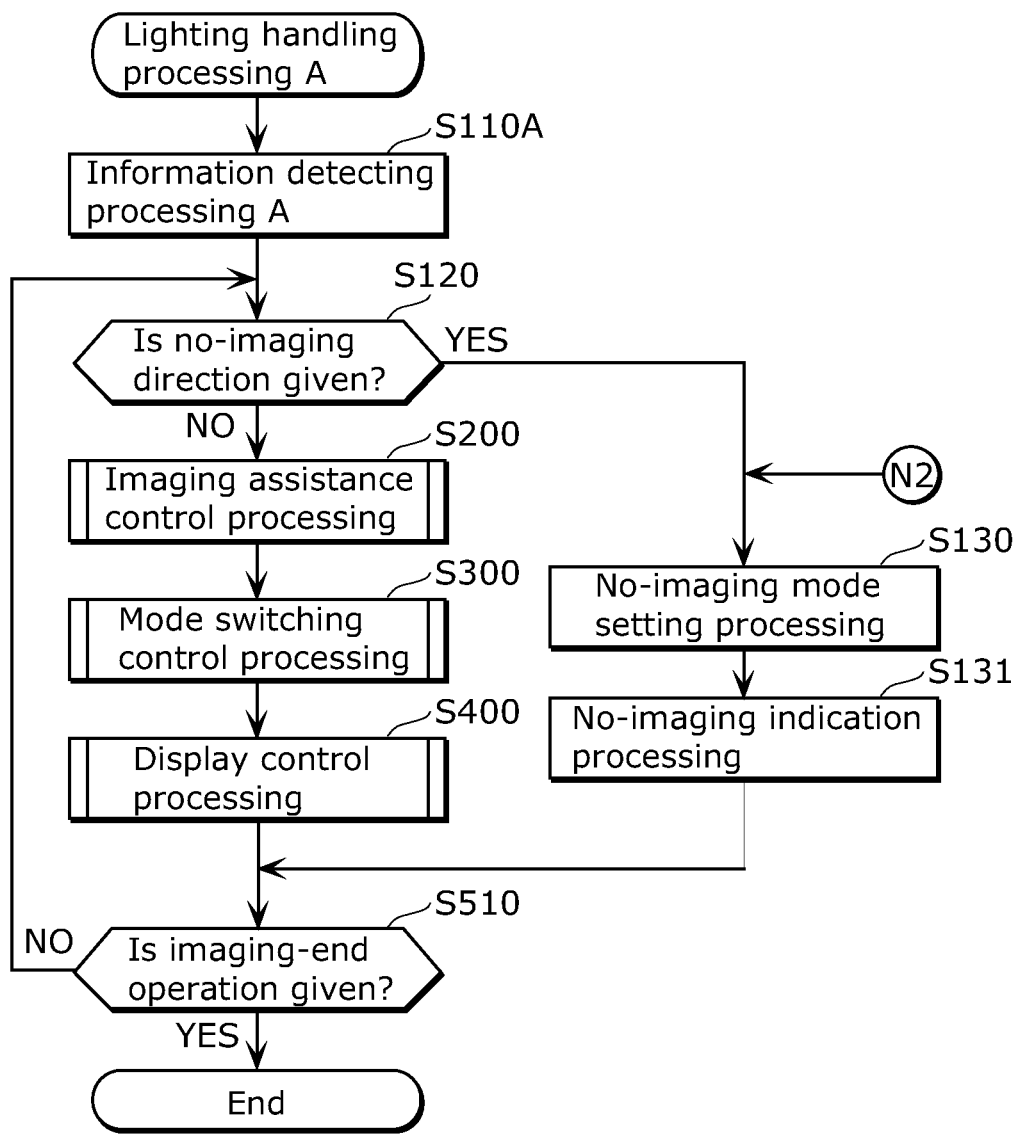
FIG. 18 depicts a flowchart showing lighting handling processing A.

FIG. 18 depicts a flowchart showing the lighting handling processing A. The same numerical references of the steps in FIG. 18 as those of the steps in FIG. 8 show processing similar to that described in the embodiment. Thus, the details thereof shall be omitted.

A comparison shows that the lighting handling processing A differs from the lighting handling processing in FIG. 8 in that the lighting handling processing A includes Step S110A instead of Step S110.

A comparison shows that information detecting processing A in Step S110A differs from the information detecting processing in Step S110 in that the information detecting processing A does not include signal conversion processing. The processing other than the above is similar to that in Step S110, and the details thereof shall be omitted.

From each of the luminance values indicated in the luminance signal received from the image processing unit 120, the light pattern detecting unit 141 detects information overlaid on the illuminating light. It is noted that the processing to detect the information is similar to that in Step S110. Thus, the details thereof shall be omitted. Hence, the light pattern detecting unit 141 detects, as a light-dark pattern, states of luminance values corresponding to a picture in order to detect the information overlaid on the illuminating light.

It is noted that the processing after Step S110A is similar to that described in the embodiment. Thus, the details thereof shall be omitted.

As described above, the example according to the embodiment successfully achieves an effect similar to that achieved in the embodiment. Hence, the example successfully achieves detection of information overlaid on light at a low cost.

[Illuminating Light]

The embodiment and the example according to the embodiment show the case where the illuminating apparatus 50 is a liner fluorescent lamp. However, the present invention shall not be limited to this. The illuminating apparatus 50 may be, for example, an LED light, a fluorescent lamp inverter, and the like.

Described hereinafter is how to overlay information on illuminating light when the illuminating apparatus 50 is an LED light. The LED light converts an AC voltage provided from a commercial power supply into a DC voltage, and emits the illuminating light using the DC voltage. Here, the power supply control circuit in the illuminating apparatus 50 changes the wave of the DC voltage for emitting light in order to overlay information on the illuminating light.

Figure 19:
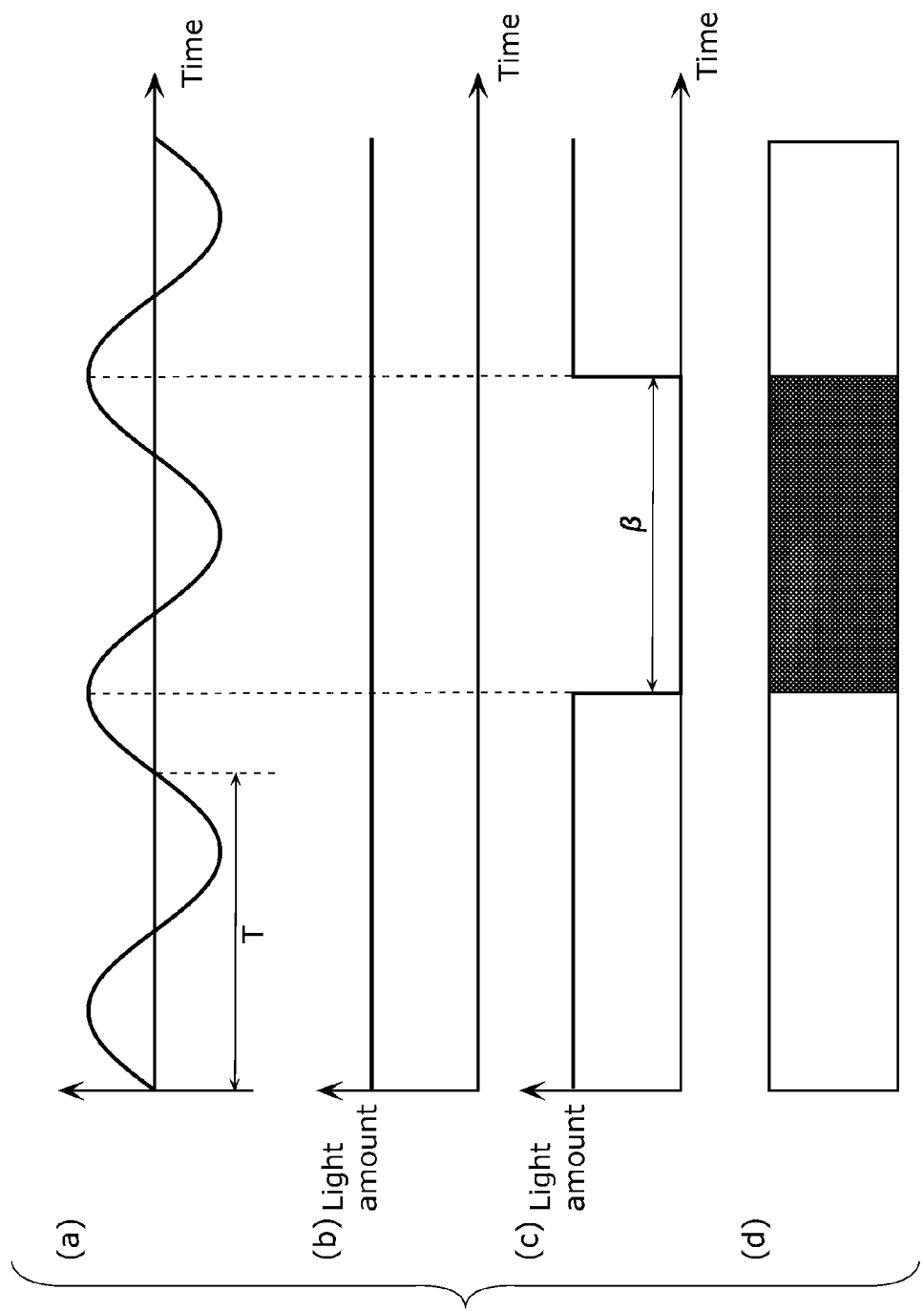
FIG. 19 shows how to overlay information on illuminating light.

FIG. 19 shows how to overlay the information on the illuminating light.

The illustration (a) in FIG. 19 shows the same waveform of the AC voltage as shown in the illustration (a) in FIG. 2.

As (b) in FIG. 19 shows, the LED light has constant brightness, and does not have a period of change in light amount.

Hence, the power supply control circuit of the illuminating apparatus 50 controls the voltage to be supplied to the LED light in order to change the amount of the illuminating light as shown in (c) in FIG. 19. In other words, the illuminating light can develop a light-dark period.

A waveform for the period $\beta$ in (c) in FIG. 19 is developed at a specific period, so that the information is successfully overlaid on the illuminating light.

The illustration (d) in FIG. 19 visualizes how the light amount in (c) in FIG. 2 changes.

Described hereinafter is how to overlay information on the illuminating light when the illuminating apparatus 50 is a fluorescent lamp inverter.

Figure 20:
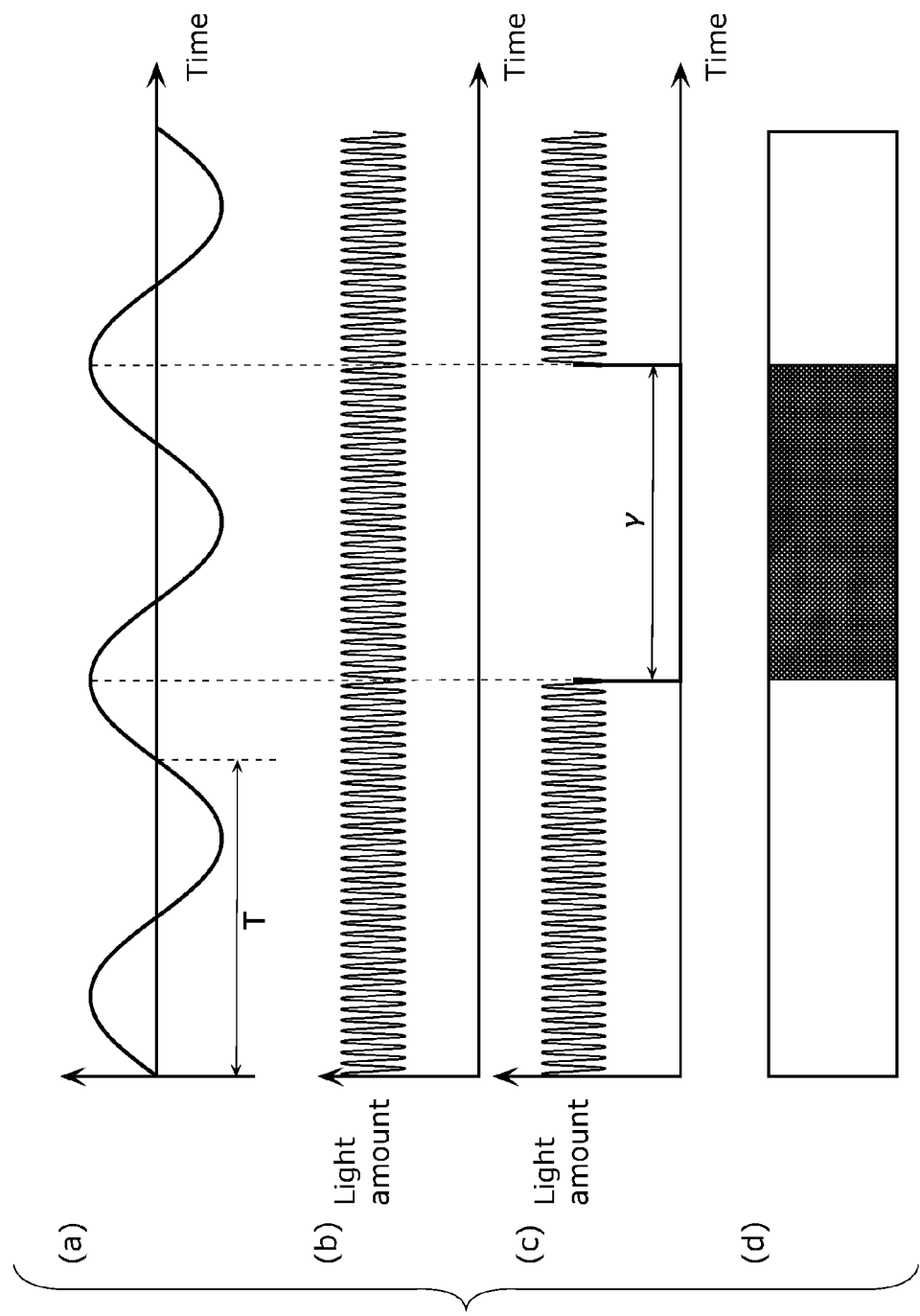
FIG. 20 shows how to overlay information on illuminating light.

The illustration (a) in FIG. 20 shows the same waveform of the AC voltage as shown in the illustration (a) in FIG. 2.

Out of an AC voltage provided from a not-shown commercial power supply, the fluorescent lamp inverter generates an AC voltage having higher frequency (hereinafter referred to as a high-frequency AC voltage) for use. Hence, the power supply control circuit of the illuminating apparatus 50 controls the voltage to be supplied to the fluorescent lamp inverter in order to significantly change the amount of the illumination light as shown in (c) in FIG. 20. In other words, the illuminating light can develop a light-dark period.

Specifically, a waveform for the period $\gamma$ in (c) in FIG. 20 is developed, so that the information is successfully overlaid on the illuminating light.

The illustration (d) in FIG. 20 visualizes how the light amount in (c) in FIG. 20 changes.

When the illuminating light having the information overlaid is also used as shown FIGS. 19 and 20, the following is detected as a light-dark pattern: a light-dark period per unit time, and how many times the light part and the dark part switch with each other in a certain period. Consequently, the information overlaid on the illuminating light can be detected.

Figure 21:
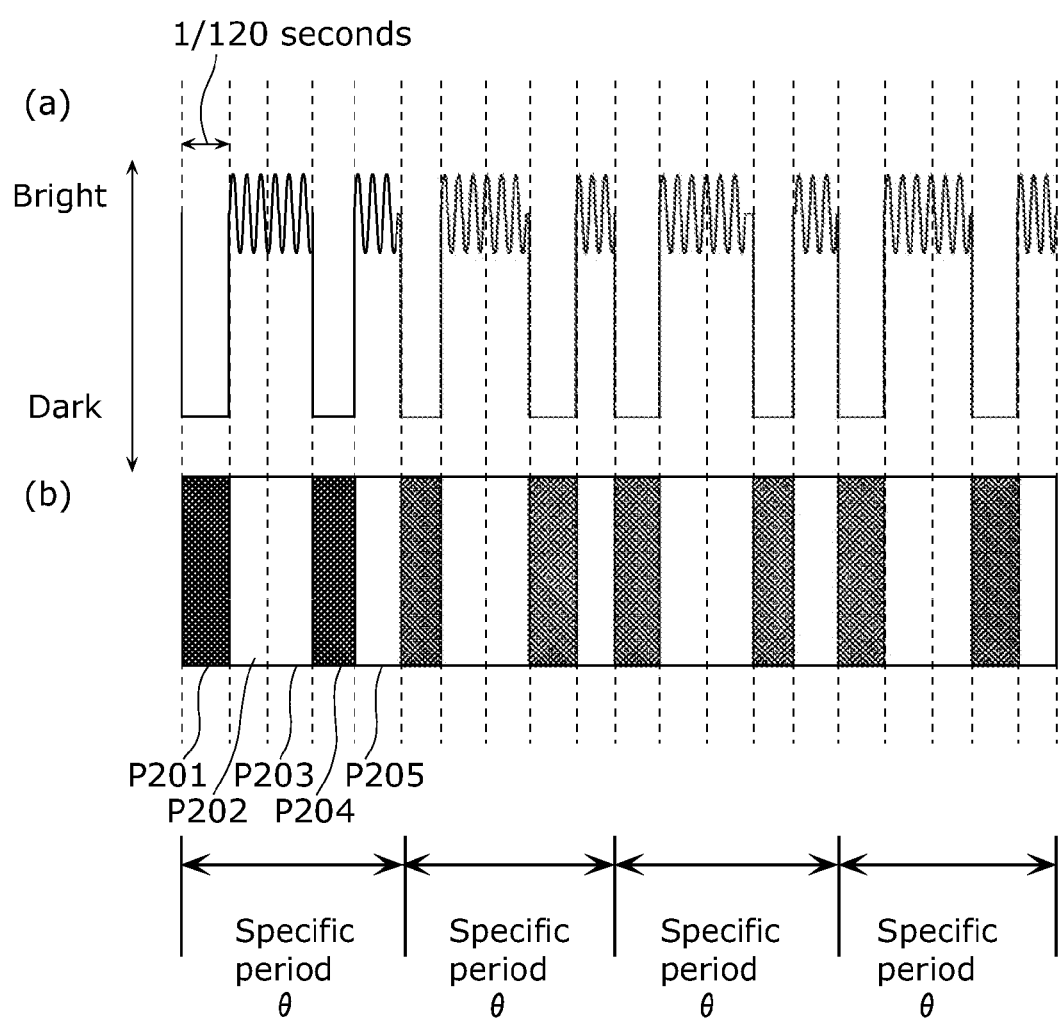
FIG. 21 shows how to detect a specific period of a light-dark pattern overlaid on the illuminating light, based on multiple pictures.

Described next with FIG. 21 is how to detect a light-dark pattern overlaid on illuminating light and found in a specific period based on multiple pictures, when the illuminating apparatus 50 is a fluorescent lamp inverter.

The illustration (a) in FIG. 21 shows a change in light amount when 5-bit information in a specific period $\theta$ is included in (overlaid on) illuminating light whose frequency is 120 Hz. The illustration (a) in FIG. 21 shows the time axis in a lateral direction.

The illustration (b) in FIG. 21 shows some of the pictures indicated in a luminance signal obtained in information detecting processing. The some pictures are pictures P201, P202, P203, P204, and P205. It is noted that, pictures P201 to P205 actually show an image of the object. For the sake of description, however, no image of the object is shown in the pictures.

The pictures P201, P202, P203, P204, and P205 are generated in this order. In other words, the picture P205 is generated after the picture P201.

Each of the pictures P201, P202, P203, P204, and P205 corresponds to the time axis of (a) in FIG. 21.

For the pictures P201 to P205, the light pattern detecting unit 141 sets, as a determination picture, a picture corresponding to a part having a predetermined amount or more of the illuminating light. The determination picture is used for detecting the information.

As an example of specific period information, suppose the case where pictures P201 and P204 are set as determination pictures.

Here, each of the pictures P202, P203, and P205 is a high brightness picture. Suppose a high brightness picture and a low brightness picture are defined as "0" and "1", respectively. Here, in order to detect "0" and "1", the light pattern detecting unit 141 determines whether or not an average luminance value of the pixels constituting each of the determination pictures is equal to or greater than the determination threshold value P.

Here, the light pattern detecting unit 141 can determine that a direction code "10010" is overlaid as direction information at a specific period. The comparing unit 142 reads the direction code from the storage unit 143, and returns the detail corresponding to the direction code "10010" to the processing unit 150. For example, when a direction code is "10010", the direction corresponding to the direction code is "No flash lighting" as shown in FIG. 6.

Using the technique described above, the light pattern detecting unit 141 detects a light-dark pattern from the image signal in order to detect the information overlaid on the illuminating light.

The technique to overlay the information on the illuminating light shall not be limited to the above one. For example, the power supply control circuit of the illuminating apparatus 50 may control the voltage so that a bright time period and a dark time period do not become equal to each other in the illuminating light.

Furthermore, in the illuminating light, two periods of a specific time may be defined "1" and one period of a specific time may be defined "0" so that the information may be overlaid on a part corresponding to a discontinuing period in the illuminating light.

Other Example

Each of the imaging apparatuses 100 and 100A includes the EVF 131 instead of an OVF. However, the imaging apparatuses 100 and 100A may include an OVF.

Furthermore, each of the imaging apparatus 100 and 100A includes the flash lighting unit 171; however, the imaging apparatus 100 and 100A do not have to include the flash lighting unit 171. Each of the imaging apparatus 100 and 100A may externally have the flash lighting unit 171. Furthermore, each of the imaging apparatus 100 and 100A does not have to include the flash lighting unit 171. In such a case, the imaging apparatus 100 and 100A do not have to carry out the flash-lighting-related processing in the imaging assistance control processing shown FIG. 11.

In addition, each of the imaging apparatus 100 and 100A includes the assist light emitting unit 172; however, the imaging apparatus 100 and 100A do not have to include the assist light emitting unit 172. In such a case, the imaging apparatus 100 and 100A do not have to carry out the processing related to the assist light emitting unit 172 in the imaging assistance control processing.

In the embodiment and the example according to the embodiment, the user is not sometimes informed beforehand. However, the user may be notified before the switching that the display is switched through the display unit 132 or the EVF 131.

[Functional Block Diagram]

Figure 22:
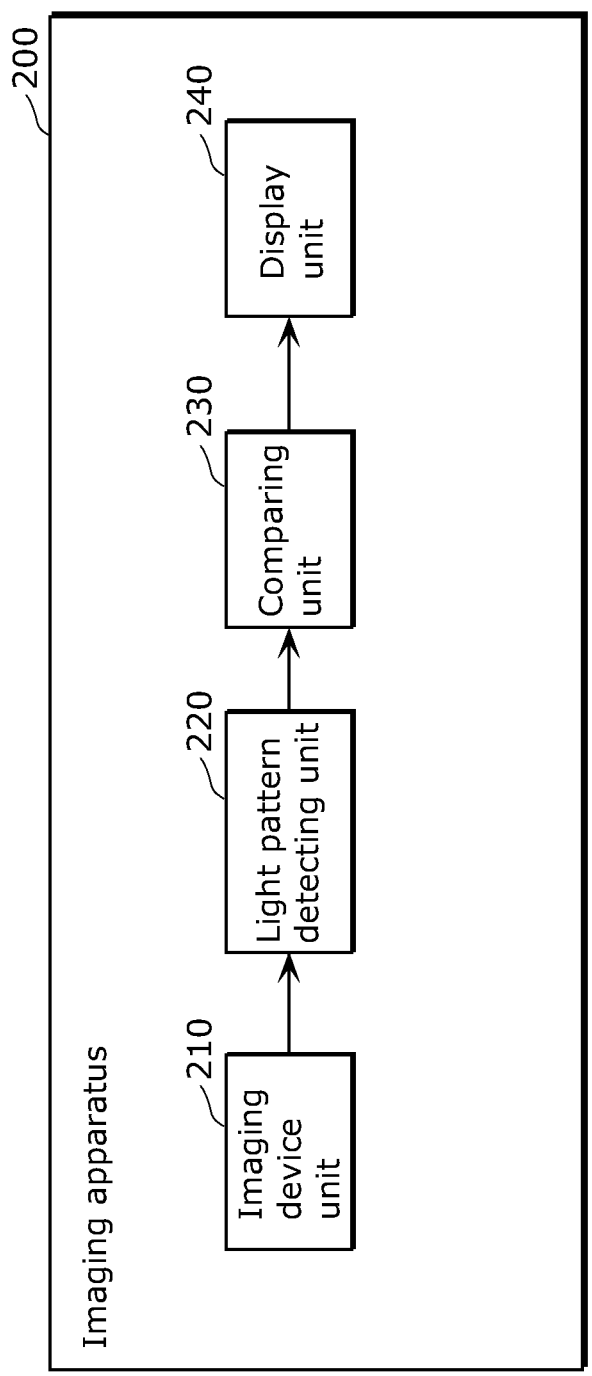
FIG. 22 depicts a block diagram showing a characteristic functional structure of an imaging apparatus.

FIG. 22 depicts a block diagram showing a characteristic functional structure of an imaging apparatus 200. The imaging apparatus 200 is equivalent to the imaging apparatus 100 or the imaging apparatus 100A. In other words, among the functions of the imaging apparatus 100 or the imaging apparatus 100A, FIG. 22 shows major functions related to the present invention.

The imaging apparatus 200 images an object subject to illuminating light on which information is overlaid.

The imaging apparatus 200 functionally includes an imaging device unit 210, a light pattern detecting unit 220, a comparing unit 230, and a display unit 240.

The imaging device unit 210 converts the light which comes from the object into an image signal. Here, the light is the illuminating light reflected off the object. The imaging device unit 210 is equivalent to the imaging device unit 112. The light pattern detecting unit 220 detects a light-dark pattern from the image signal into which the imaging device unit 210 converts the light to detect the information overlaid on the illuminating light. The light pattern detecting unit 220 is equivalent to the light pattern detecting unit 141.

The comparing unit 230 compares detection information with predetermined determination information. Here, the detection information is the information detected by the light pattern detecting unit 220. For example, the comparing unit 230 is equivalent to the comparing unit 142 which carries out the processing in Step S120 in FIG. 8.

The display unit 240 displays a specific image, depending on a result of the comparison carried out by the comparing unit 230. For example, the display unit 240 is equivalent to the display unit 132 which displays the specific image 3 in Step S131 in FIG. 8.

It is noted that the some or all of the imaging device unit 210, the light pattern detecting unit 220, and the comparing unit 230 included in the imaging apparatus 200 may be configured in a form of hardware such as a Large Scale Integration (LSI). Moreover, some or all of the imaging device unit 210, the light pattern detecting unit 220 and the comparing unit 230 may be a program module executed on a processor such as a CPU.

Although only an exemplary embodiment of the imaging apparatus 100 or the imaging apparatus 100A according to this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Part or all of the constituent elements included in the imaging apparatus 100 or the imaging apparatus 100A may be configured in a form of hardware. Part or all the constituent elements constituting the imaging apparatus 100 or the imaging apparatus 100A may be configured in a form of a program module executed on a CPU and the like.

Part or all of the constituent elements constituting the imaging apparatus 100 or the imaging apparatus 100A may be configured in a form of a single System-LSI. The System-LSI is a super-multi-function LSI manufactured by integrating constituent units on one chip. Specifically, the System-LSI is a computer system including a microprocessor, a ROM, a RAM, or by means of a similar device.

In FIG. 4, for example, the image processing unit 120, the light pattern detecting unit 141, the comparing unit 142, and the processing unit 150 are formed in a single System-LSI.

Moreover, the units executing the above processing may be formed in a single unit or formed in multiple separated units. Specifically, the processing may be integrated one or distributed one.

Furthermore, the present invention may be implemented as an information detecting method achieving, as steps, operations of characteristic units in the imaging apparatus 100 or the imaging apparatus 100A.

The information detecting method according to an implementation of the present invention is equivalent to some or all of the lighting handling processing in FIG. 8 and the lighting handling processing A in FIG. 18 (for example, Steps S110, S120, S131, and the like). The information detecting method does not necessarily include all the steps in FIGS. 8 and 18. In other words, the information detecting method may include minimum steps to achieve an effect of the present invention. Here, such minimum steps are Steps S110, S120, and S131 in FIG. 8.

In addition, the present invention may be implemented as a program which causes a computer to execute each of the steps included in the information detecting method. The present invention may also be implemented as a computer-readable recording medium which stores such a program. The program may be distributed through a transmission medium such as the Internet.

The disclosed embodiment is an example in all respects, and therefore shall not be defined as they are. The scope of invention shall be defined not by the above descriptions but by claims, and shall include all modifications which are equivalent to and within the scope of the claims.

INDUSTRIAL APPLICABILITY

The present invention is usable as an imaging apparatus capable of detecting information overlaid on light at a low cost.

The invention claimed is:

1. An apparatus comprising:
an imaging device unit configured to receive light which comes from an object and on which information is overlaid, and convert the light received into an image signal, the information having a particular meaning represented by a light intensity of the light which varies over time;
a light pattern detecting unit configured to detect a light-dark pattern by generating a luminance signal based on a data item made of color components, so as to detect the information overlaid on the light, the data item being outputted from the imaging device unit; and
a display unit configured to perform a specific display, depending on a result of a comparison between the information detected by the light pattern detecting unit and predetermined determination information.

2. The apparatus according to claim 1,
wherein the color components are red, green and blue (RGB) components.

3. The apparatus according to claim 1,
wherein the image signal is a signal indicating a plurality of pictures constituting a moving image.

4. The apparatus according to claim 1,
wherein the imaging device unit is configured to convert the light which comes from the object into the image signal, using a complementary metal oxide semiconductor (CMOS) image sensor,
the image signal indicates a raw data item corresponding to a picture,
the light pattern detecting unit is configured to calculate, based on the raw data item, luminance values for pixels which constitute the picture corresponding to the raw data item, and
the light pattern detecting unit is configured to detect, as the light-dark pattern, states of the luminance values corresponding to the picture.

5. The apparatus according to claim 1,
wherein the imaging device unit is configured to convert the light which comes from the object into the image signal, using a charge coupled device (CCD) image sensor,
the image signal indicates raw data items each corresponding to one of a plurality of pictures,
the light pattern detecting unit is configured to calculate, based on each of the raw data items, luminance values for pixels which constitute the one of the plurality of pictures corresponding to the raw data item, and
the light pattern detecting unit is configured to detect, as the light-dark pattern, a state of each of the luminance values corresponding to one of the plurality of pictures.

6. The apparatus according to claim 1,
wherein the display unit is configured to perform the specific display in the case where the information detected by the light pattern detecting unit matches with the predetermined determination information.

7. The apparatus according to claim 6,
wherein the specific display is a display of an image.

8. The apparatus according to claim 1,
wherein the specific display is a display of an image.

9. A system comprising:
an illuminating apparatus which emits light on which information is overlaid, the information having a particular meaning represented by a light intensity of the light which varies over time;
an object subject to the light on which the information is overlaid; and
an apparatus which receives light which comes from the object, the received light including the light on which the information is overlaid,
wherein the apparatus includes:
an imaging device unit configured to convert the light which comes from the object into an image signal;
a light pattern detecting unit configured to detect a light-dark pattern by generating a luminance signal based on a data item made of color components, so as to detect the information overlaid on the light, the data item being outputted from the imaging device unit; and
a display unit configured to perform a specific display, depending on a result of a comparison between the information detected by the light pattern detecting unit and predetermined determination information.

10. The system according to claim 9,
wherein the illuminating apparatus is a Light Emitting Diode (LED) illuminating apparatus.

11. The system according to claim 9,
wherein the light received by the apparatus includes (i) the light emitted from the illuminating apparatus and reflected off the object, and (ii) the light emitted from the illuminating apparatus.

12. The system according to claim 9,
wherein the display unit is configured to perform the specific display in a case where the information detected by the light pattern detecting unit matches with the predetermined determination information.

13. The system according to claim 12,
wherein the specific display is a display of an image.

14. The system according to claim 9,
wherein the specific display is a display of an image.

15. The system according to claim 9,
wherein the color components are red, green and blue (RGB) components.

16. An apparatus comprising:
an imaging device unit configured to: receive light which comes from an object and on which information is overlaid; and convert the received light into an image signal, the information having a particular meaning represented by a light intensity of the light which varies over time;
a light pattern detecting unit configured to detect the information overlaid on the light, based on a data item made of color components, the data item being outputted from the imaging device unit; and
a display unit configured to perform a specific display, depending on a result of a comparison between the information detected by the light pattern detecting unit and predetermined determination information.

17. The apparatus according to claim 16,
wherein the color components are red, green and blue (RGB) components.

18. The apparatus according to claim 16,
wherein the display unit is configured to perform the specific display in a case where the information detected by the light pattern detecting unit matches with the predetermined determination information.

19. The apparatus according to claim 18, wherein the specific display is a display of an image.

20. The apparatus according to claim 16, wherein the specific display is a display of an image.

* * * * *